(12) United States Patent
Takemoto et al.

(10) Patent No.: US 11,271,498 B2
(45) Date of Patent: Mar. 8, 2022

(54) BRUSHLESS DC MOTOR HAVING DRIVE CIRCUIT GENERATING SUPERIMPOSED SIGNAL

(71) Applicant: NIDEC CORPORATION, Kyoto (JP)

(72) Inventors: Hideyuki Takemoto, Kyoto (JP); Naoyuki Kanamori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 26 days.

(21) Appl. No.: 16/638,134

(22) PCT Filed: Sep. 10, 2018

(86) PCT No.: PCT/JP2018/033352
§ 371 (c)(1),
(2) Date: Feb. 11, 2020

(87) PCT Pub. No.: WO2019/065170
PCT Pub. Date: Apr. 4, 2019

(65) Prior Publication Data
US 2020/0177115 A1   Jun. 4, 2020

(30) Foreign Application Priority Data
Sep. 28, 2017 (JP) ............................. JP2017-188802

(51) Int. Cl.
*H02P 6/06* (2006.01)
*H02P 25/024* (2016.01)
(Continued)

(52) U.S. Cl.
CPC .............. *H02P 6/06* (2013.01); *H02K 29/08* (2013.01); *H02K 29/14* (2013.01); *H02P 6/08* (2013.01);
(Continued)

(58) Field of Classification Search
CPC ...... C09K 13/00; C09G 1/02; H01L 21/67069; H01L 21/31116; H01L 21/31144;
(Continued)

(56) References Cited

U.S. PATENT DOCUMENTS 4,228,396 A * 10/1980 Palombo ................. G01P 3/486
  318/272
4,498,037 A *  2/1985 Razavi ................. G05D 3/1445
  318/561
(Continued)

FOREIGN PATENT DOCUMENTS

| JP | H1083215   | 3/1998 |
| JP | 2014027860 | 2/2014 |
| JP | 2014165969 | 9/2014 |

OTHER PUBLICATIONS

"International Search Report (Form PCT/ISA/210) of PCT/JP2018/033352," dated Dec. 11, 2018, with English translation thereof, pp. 1-2.

*Primary Examiner* — Rina I Duda
(74) *Attorney, Agent, or Firm* — JCIPRNET

(57) ABSTRACT

The identification method according to an embodiment is used for an identification device for identifying the type of a brushless DC motor. A brushless DC motor includes an output terminal for outputting a signal. The output terminal is able to output a signal obtained by superimposing signal types. The signal resulting from the superimposition is different depending on the types of brushless DC motors. In the identification method, power is supplied to a brushless DC motor, and the signal resulting from the superimposition that is output from the output terminal of the brushless DC motor is input to an identification device. The signal resulting from the superimposition is separated into signal types, and the separated signals are used to identify the type of the brushless DC motor.

19 Claims, 18 Drawing Sheets

(51) Int. Cl.
  *H02P 25/03*   (2016.01)
  *H02K 29/08*   (2006.01)
  *H02K 29/14*   (2006.01)
  *H02P 6/08*   (2016.01)
  *H02P 6/18*   (2016.01)

(52) U.S. Cl.
  CPC .............. *H02P 6/18* (2013.01); *H02P 25/024* (2016.02); *H02P 25/03* (2016.02)

(58) Field of Classification Search
  CPC . G05B 19/19; G05B 2219/41365; H02P 6/08; H02P 6/28
  See application file for complete search history.

(56) References Cited

U.S. PATENT DOCUMENTS

| | | | | |
|---|---|---|---|---|
| 4,651,068 A | * | 3/1987 | Meshkat-Razavi | H02P 6/06 318/400.02 |
| 4,879,498 A | * | 11/1989 | Shinohara | H02P 1/18 318/400.11 |
| 5,448,141 A | * | 9/1995 | Kelley | H02P 6/085 318/400.01 |
| 6,639,376 B1 | * | 10/2003 | Hayashi | G05B 19/19 318/560 |
| 2006/0152891 A1 | | 7/2006 | Jreij et al. | |

* cited by examiner

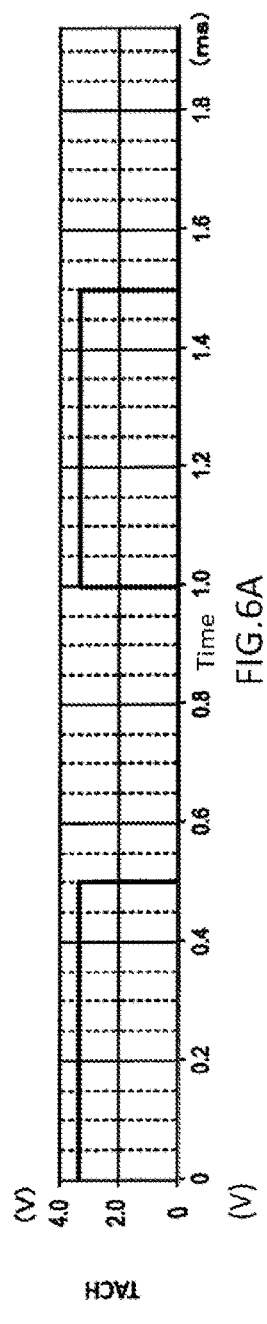
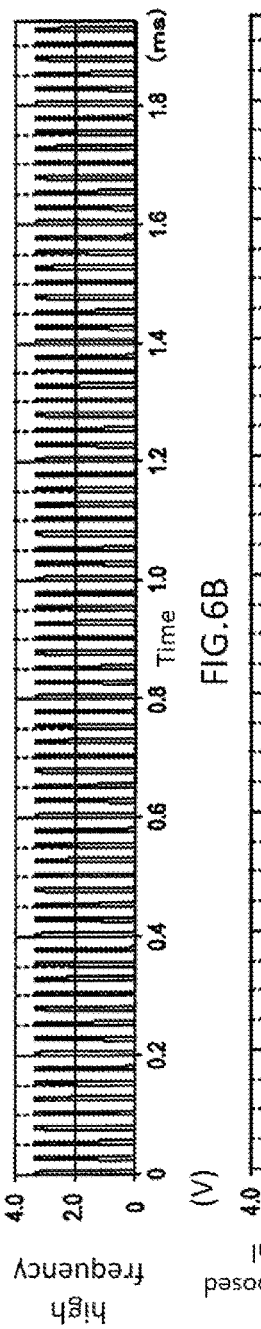
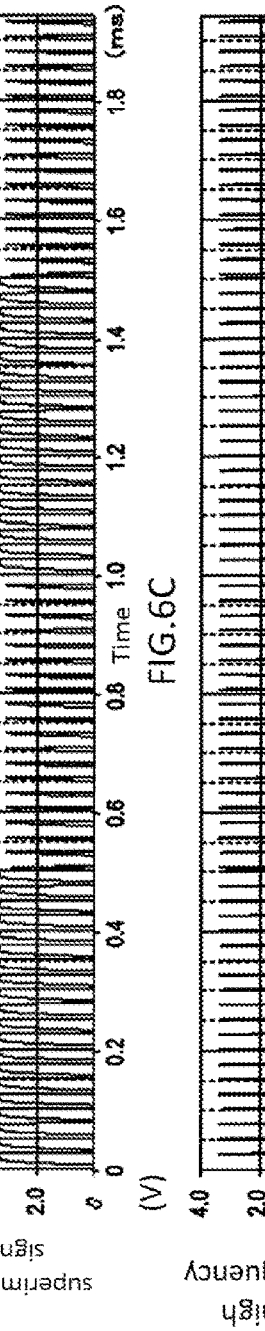
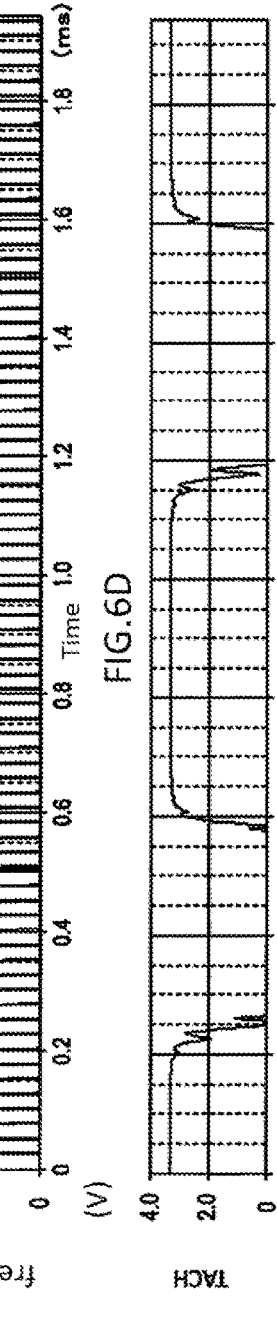
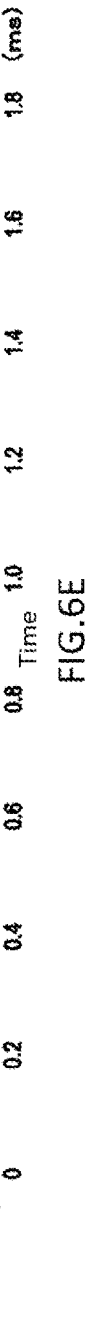
FIG.6A
FIG.6B
FIG.6C
FIG.6D
FIG.6E

| Identifying a type of a brushless DC motor | | | duty ratio |
|---|---|---|---|
| 3'b001 // | Supplier | A | 5%±2% |
| 3'b010 // | Supplier | B | 10%±2% |
| 3'b011 // | Supplier | C | 20%±2% |

| Identifying a type of a brushless DC motor | | Frequency |
|---|---|---|
| 3'b001 // | Supplier A | 40kHz±5% |
| 3'b010 // | Supplier B | 50kHz±5% |
| 3'b011 // | Supplier C | 60kHz±5% | ary
BRUSHLESS DC MOTOR HAVING DRIVE CIRCUIT GENERATING SUPERIMPOSED SIGNAL

CROSS-REFERENCE TO RELATED APPLICATION

This application is a 371 application of the International PCT application serial no. PCT/JP2018/033352, filed on Sep. 10, 2018, which claims the priority benefits of Japan Patent Application No. 2017-188802, filed on Sep. 28, 2017. The entirety of each of the above-mentioned patent applications is hereby incorporated by reference herein and made a part of this specification.

TECHNICAL FIELD

The present disclosure relates to a brushless DC motor, and an identification method and identification device for identifying a type of a brushless DC motor.

BACKGROUND ART

Many electronic devices include, for example, a fan motor as a cooling device for releasing heat generated in the interior to the outside. In electronic devices, the fan motor is electrically connected to a system controller and operates under control of the system controller.

SUMMARY OF INVENTION

In the conventional technology described above, a method of more easily identifying the type of the brushless DC motor has been desired.

Solution to Problem

An exemplary identification method of the present disclosure is an identification method used for an identification device, including identifying a type of a brushless DC motor, wherein the brushless DC motor includes an output terminal for outputting a signal, the output terminal is able to output a superimposed signal in which signals of a plurality of types are superimposed, the superimposed signal differs for each type of a plurality of brushless DC motors, power is supplied to the brushless DC motors, the superimposed signal output from the output terminal of the brushless DC motor is input to the identification device, the superimposed signal is separated into signals of a plurality of types, and the type of the brushless DC motor is identified using a separated signal.

The above and other elements, features, steps, characteristics and advantages of the present disclosure will become more apparent from the following detailed description of the preferred embodiments with reference to the attached drawings.

BRIEF DESCRIPTION OF DRAWINGS

FIG. 6A to FIG. 6E are diagrams showing examples of signal waveforms according to the embodiment.

DESCRIPTION OF EMBODIMENTS

An identification method and an identification device for identifying the type of a brushless DC motor according to an embodiment of the present disclosure will be described below in detail with reference to the appended drawings. However, in order to prevent description in the following from being unnecessarily redundant and to facilitate understanding for those skilled in the art, unnecessarily detailed descriptions may be omitted. For example, detailed description of already well-known matters and redundant descriptions of substantially the same components may be omitted.

[1-1. Configuration Example of User System 100 and Brushless DC Motor 200]

Figure 1:
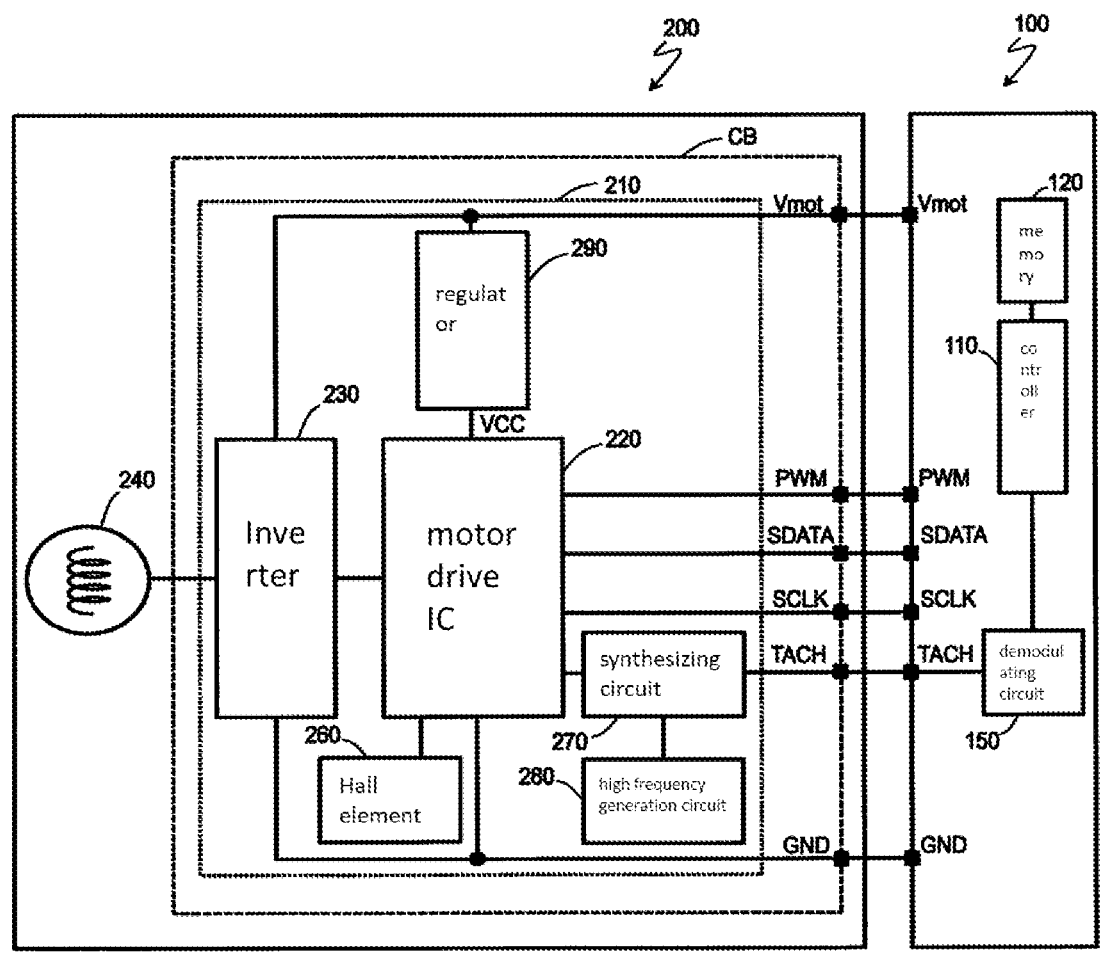
FIG. 1 is a block diagram showing a user system 100 and a brushless DC motor 200 according to an embodiment.

FIG. 1 schematically shows a typical block configuration example of a user system 100 and a brushless DC motor 200. In this specification, the structure and operation of the brushless DC motor 200 will be described using a fan motor as an example. The brushless DC motor of the present disclosure includes an inner rotor type or outer rotor type motor. The brushless DC motor 200 is not limited to a fan motor but is a brushless DC motor used for various applications. For example, the brushless DC motor 200 is a motor used for home electric applications such as an air conditioning device and a washing machine, and an in-vehicle motor.

The user system 100 is electrically connected to the brushless DC motor 200. The user system 100 is able to control the brushless DC motor 200. The user system 100 is able to be mounted in a production management system of a brushless DC motor in a factory in which various products are produced. In addition, the user system 100 may be a system in an electronic device or an in-vehicle system in which the brushless DC motor 200 is able to be mounted. For example, the brushless DC motor 200 is suitably mounted in a main body of a desktop personal computer or an electronic device such as a game machine. For example, when the brushless DC motors 200 with different specifications are produced in the same location, the user system 100 may be a part of a series of inspection systems. In addition, the brushless DC motor 200 may be mounted in a main body of a server or a desktop personal computer as a fan motor, the user system 100 being the entire system or a part thereof composed of various electronic components mounted in a motherboard.

The user system 100 includes, for example, a controller 110, a memory 120 and a demodulating circuit 150. As will be described below, the user system 100 according to the present embodiment has a function of identifying the type of the brushless DC motor 200. In other words, the user system 100 is able to be used as an identification device that identifies the type of the brushless DC motor 200. Therefore, in this specification, the user system 100 may be referred to as the identification device 100.

The controller 110 is able to control the entire user system 100 and the brushless DC motor 200. The controller 110 is able to additionally identify the type of the brushless DC motor 200. The controller 110 is, for example, a semiconductor integrated circuit such as a micro control unit (MCU) or a field programmable gate array (FPGA).

The memory 120 is, for example, a writable memory (for example, PROM), a rewritable memory (for example, a flash memory), or a read-only memory. The memory 120 stores a control program having an instruction group for causing the controller 110 to control the brushless DC motor 200. The memory 120 additionally stores a control program having an instruction group for causing the controller 110 to identify the type of the brushless DC motor 200. For example, such a control program may be temporarily loaded into a RAM (not shown) during booting. Here, the memory 120 does not need to be externally attached to the controller 110 and may be mounted in the controller 110. The controller 110 mounted in the memory 120 is, for example, the above MCU.

Although details will be described below, the brushless DC motor 200 outputs a signal in which signals of a plurality of types are superimposed to the controller 110. The demodulating circuit 150 separates the received superimposed signal into signals of a plurality of types and outputs them to the controller 110. The controller 110 is able to identify the type of the brushless DC motor 200 using the output signal of the demodulating circuit 150.

The user system 100 includes, for example, a Vmot terminal, a PWM terminal, a TACH terminal and a GND terminal (ground terminal), as terminals for controlling the brushless DC motor 200. The user system 100 may optionally include an SDATA terminal (serial data), an SCLK terminal (serial clock terminal), a CW/CCW terminal (clockwise/counter clockwise terminal) for controlling a direction of rotation of a motor, a START/STOP terminal for instructing start and stopping of rotation of a motor, and the like. In the present embodiment, rotation of the motor is, for example, rotation of a fan motor (or a fan).

The Vmot terminal is a terminal for motor power. For example, a power supply voltage of 52 V is supplied from the Vmot terminal to the brushless DC motor 200.

The PWM terminal is an output terminal for controlling a rotational speed of a motor. The controller 110 generates a PMW signal for controlling rotation of a motor and outputs the signal to the brushless DC motor 200 via the PWM terminal.

The TACH terminal is an input terminal for a tachometer for monitoring a rotational speed of a motor.

The rotational speed is represented by the number of rotations (rpm) by which a motor rotates per unit time (1 minute) or the number of rotations (rps) by which a motor rotates per unit time (1 second). For example, two pulses per rotation of a motor are generally output from the TACH terminal of the fan motor. Generally, the duty ratio of the pulse is set to 50% in many cases. The duty ratio is represented as a proportion of Hi in one pulse period between Hi and Low. The pulse signal output from the TACH terminal of the brushless DC motor 200 according to the rotational speed of the motor is input to the TACH terminal of the user system 100.

The SDATA terminal and the SCLK terminal are input and output terminals for performing I2C communication. The SDATA terminal and the SCLK terminal are not essential terminals. Serial communication is able to be performed between the user system 100 and the brushless DC motor 200 via the SDATA terminal and the SCLK terminal.

The brushless DC motor 200 is, for example, a DC fan motor including an impeller. The brushless DC motor 200 is, for example, an axial fan, a centrifugal fan, a cross flow fan or a sirocco fan. The brushless DC motor 200 includes a drive circuit 210, a circuit board CB on which the drive circuit 210 is mounted, and a coil 240. The drive circuit 210 includes a motor drive IC 220, an inverter 230, a Hall element 260, a synthesizing circuit 270, a high frequency generation circuit 280, and a regulator 290. The coil 240 is a winding of the motor. The drive circuit 210 supplies a current to the coil 240 and drives the motor.

For example, the regulator 290 drops a voltage of a 52 V motor power and generates a power supply voltage Vcc (for example, 3.3 V or 5 V) for the motor drive IC 220. However, the regulator 290 is not essential. For example, separately from a motor power voltage, the power supply voltage Vcc may be supplied from the user system 100 to the brushless DC motor 200.

The motor drive IC 220 is connected to the inverter 230. The motor drive IC 220 generates a control signal for controlling the inverter 230 according to the PWM signal transmitted from the user system 100. The motor drive IC 220 includes an SDATA terminal and an SCLK terminal, and is able to perform I2C communication with the user system 100.

For example, the motor drive IC 220 monitors a rotational speed of a motor based on the output of the Hall element 260 and generates a pulse signal corresponding to the rotational speed of the motor. In the output method, for example, two pulses are output per rotation, and the duty ratio of the pulse is, for example, 50%. Such a pulse signal corresponding to the rotational speed of the motor may be referred to as a TACH signal in the present embodiment. The user system 100 is able to detect a rotational speed of the motor drive IC 220 from the TACH signal. Here, a technology for generating a TACH signal without using a Hall element is known. When such a technology is used, the Hall element 260 may be omitted.

The inverter 230 is electrically connected to the motor drive IC 220 and the coil 240 of the motor. The inverter 230 converts power of a motor power into power supplied to a fan motor and causes a current to flow to the coil 240.

The brushless DC motor 200 includes a Vmot terminal, a PWM terminal, an SDATA terminal, an SCLK terminal, a TACH terminal and a GND terminal corresponding to the terminals on the side of the user system 100. These terminals are arranged on the circuit board CB. The PWM terminal of the brushless DC motor 200 is an input terminal for controlling a rotational speed of a motor, and the TACH terminal is an output terminal for a tachometer.

When a motor power voltage is supplied from the user system 100 to the brushless DC motor 200 via the Vmot terminal, the motor drive IC 220 and the inverter 230 causes a current to flow to the coil 240, and the brushless DC motor 200 rotates. The Hall element 260 outputs a signal corresponding to the rotation of the brushless DC motor 200 to the motor drive IC 220. The motor drive IC 220 generates a TACH signal using the output of the Hall element 260.

The TACH signal output from the motor drive IC 220 is input to the synthesizing circuit 270. The high frequency generation circuit 280 generates a high frequency signal and outputs it to the synthesizing circuit 270. The frequency of the high frequency signal is, for example, 40 times or more a frequency of a TACH signal when the brushless DC motor 200 operates at a maximum rotational speed. The high frequency signal is, for example, a harmonic signal of the TACH signal. The synthesizing circuit 270 superimposes the TACH signal and the high frequency signal. The synthesizing circuit 270 outputs the signal obtained by superimposing the TACH signal and the high frequency signal to the user system 100 via the TACH terminal. Such a signal obtained by superimposing may be referred to as a superimposed signal in the present embodiment.

The demodulating circuit 150 separates the received superimposed signal into a TACH signal and a high frequency signal and outputs it to the controller 110. When the frequency of the TACH signal is different from the frequency of the high frequency signal by a factor of 40 or more, it is possible to easily separate the TACH signal and the high frequency signal with high accuracy. The controller 110 is able to detect a rotational speed of the motor drive IC 220 from the TACH signal. In addition, it is possible to identify the type of the brushless DC motor 200 from the high frequency signal.

For example, the duty ratio of the high frequency signal output from the high frequency generation circuit 280 differs for each type of the plurality of brushless DC motors 200. Therefore, the duty ratio of the high frequency signal is unique information of each of the brushless DC motors 200. The signal obtained by superimposing the TACH signal and the high frequency signal differs for each type of the plurality of brushless DC motors 200. The duty ratio of the high frequency signal separated by the demodulating circuit 150 differs for each type of the plurality of brushless DC motors 200. The controller 110 is able to identify the type of the brushless DC motor 200 using the duty ratio of the obtained high frequency signal.

For example, the duty ratio of the high frequency signal is able to be assigned for each supplier that produces the brushless DC motor 200. For example, a duty ratio of 5% is able to be assigned to the supplier A, a duty ratio of 10% is able to be assigned to the supplier B, and a duty ratio of 20% is able to be assigned to the supplier C. In addition, duty ratios different from these duty ratios are able to be assigned to a plurality of suppliers.

As another example, the duty ratio is able to be assigned for each product lot. For example, a duty ratio of 5% is able to be assigned to a product lot number A, a duty ratio of 10% is able to be assigned to a product lot number B, and a duty ratio of 20% is able to be assigned to a product lot number C. In addition, duty ratios different from these duty ratios is able to be assigned to a plurality of product lot numbers. Thus, for example, there is able to be as many types of a plurality of brushless DC motor as the number of suppliers. In addition, for example, there is able to be as many types of a plurality of brushless DC motor as the number of product lots to be managed.

Figure 2:
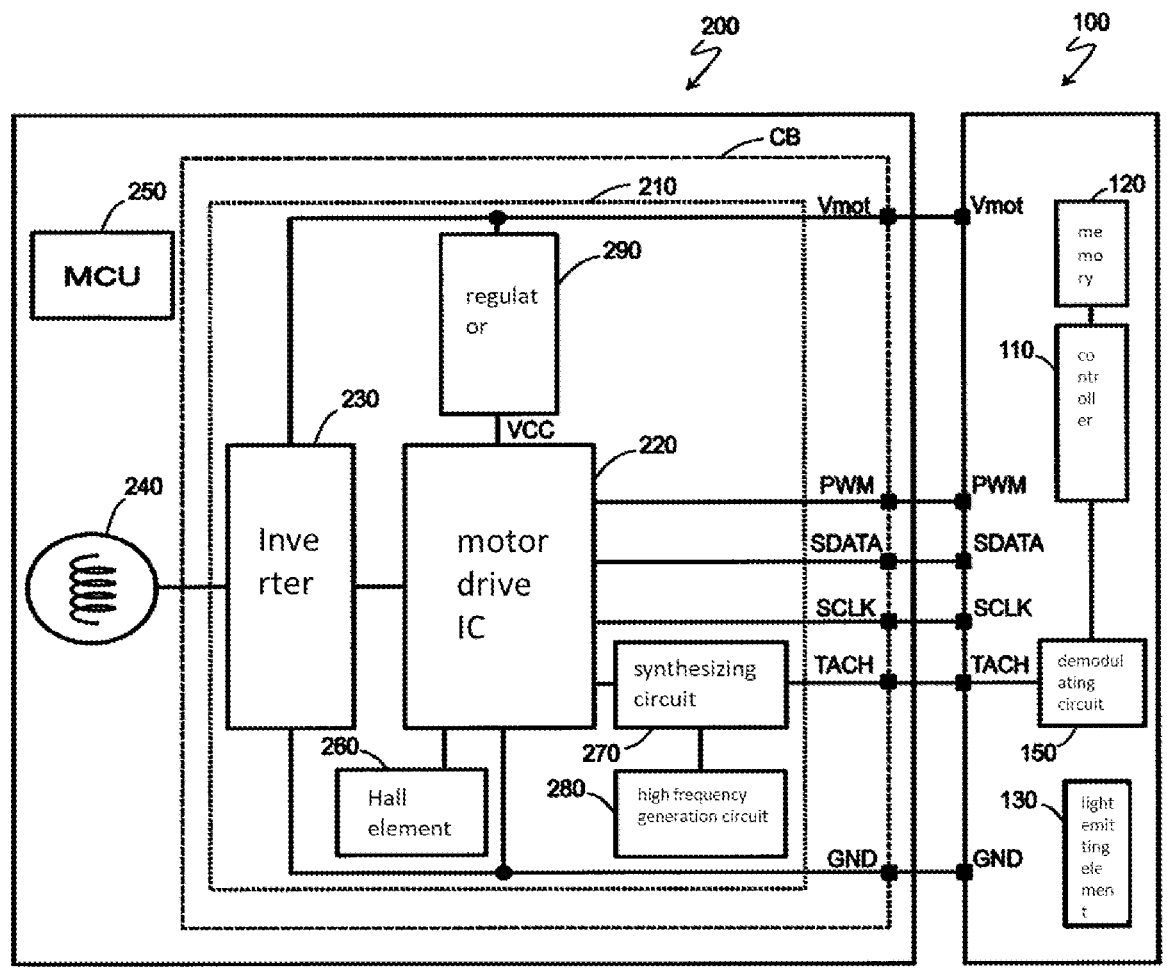
FIG. 2 is a block diagram showing another example of the user system 100 and the brushless DC motor 200 according to the embodiment.

FIG. 2 schematically shows another example of a block configuration of the user system 100 and the brushless DC motor 200.

The user system 100 may further include a light emitting element 130. The light emitting element 130 is, for example, a plurality of light emitted diodes (LEDs). The plurality of LEDs 130 are notification devices for notifying of the identification result of the type of the brushless DC motor 200. For example, the plurality of LEDs 130 are able to be provided to correspond to the number of types of a plurality of brushless DC motors. For example, when there are two types of brushless DC motor of the suppliers A and B, two LEDs having different emission colors are able to be provided. For example, a red LED for the supplier A and a blue LED for the supplier B are able to be used.

The brushless DC motor 200 may include an MCU 250. When the MCU 250 is mounted, the brushless DC motor 200 is able to be made intelligent. For example, the MCU 250 is able to directly control the motor drive IC 220.

Next, a process of identifying the type of the brushless DC motor 200 will be described in detail.

Figure 3:
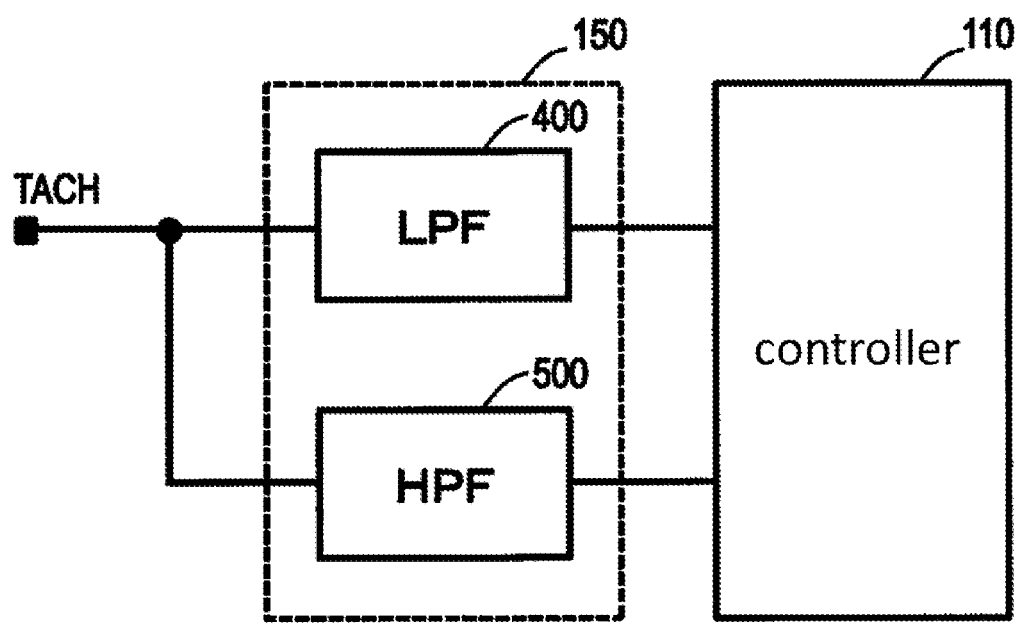
FIG. 3 is a diagram showing a demodulating circuit 150 according to the embodiment.
Figure 4:
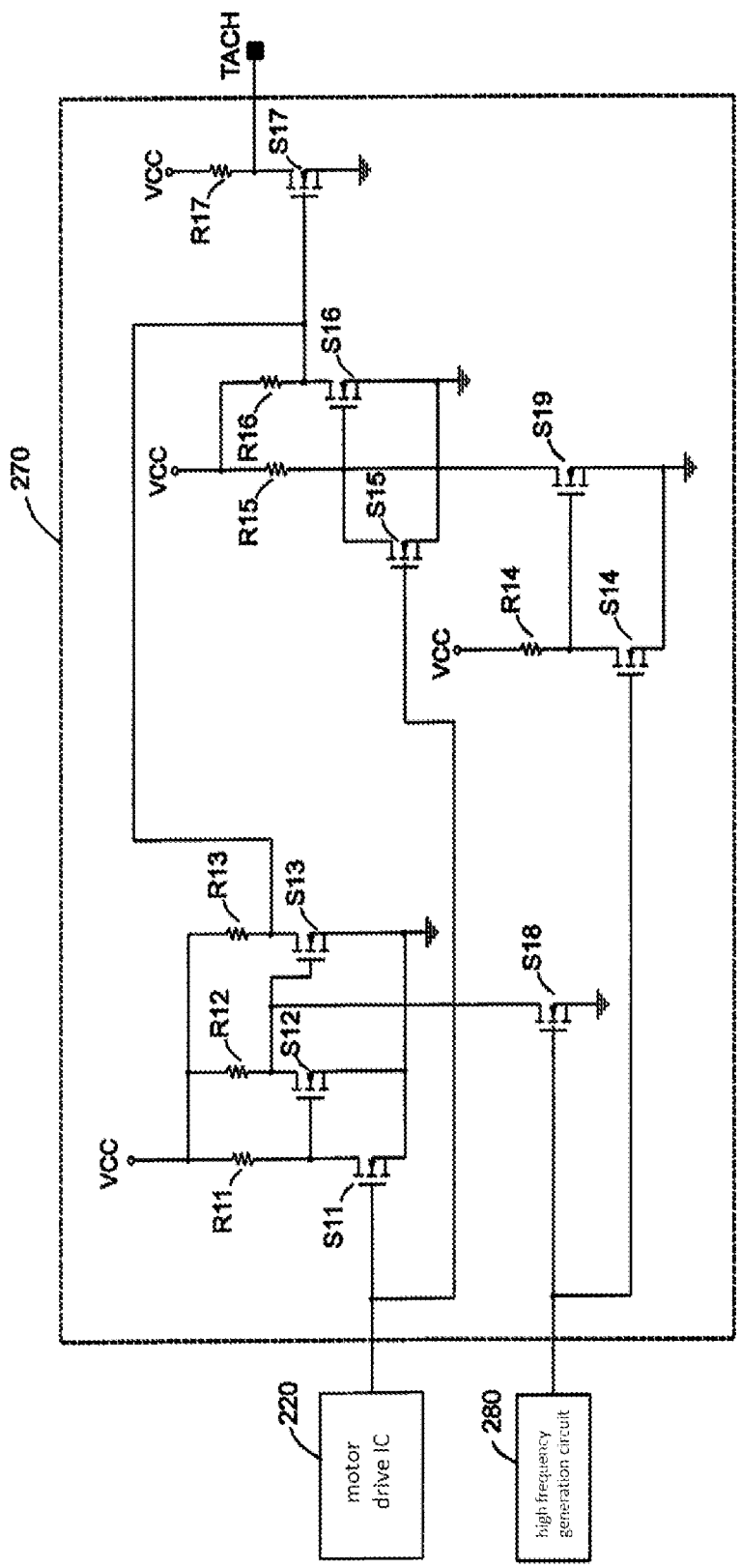
FIG. 4 is a diagram showing an example of a circuit configuration of a synthesizing circuit 270 according to the embodiment.
Figure 5:
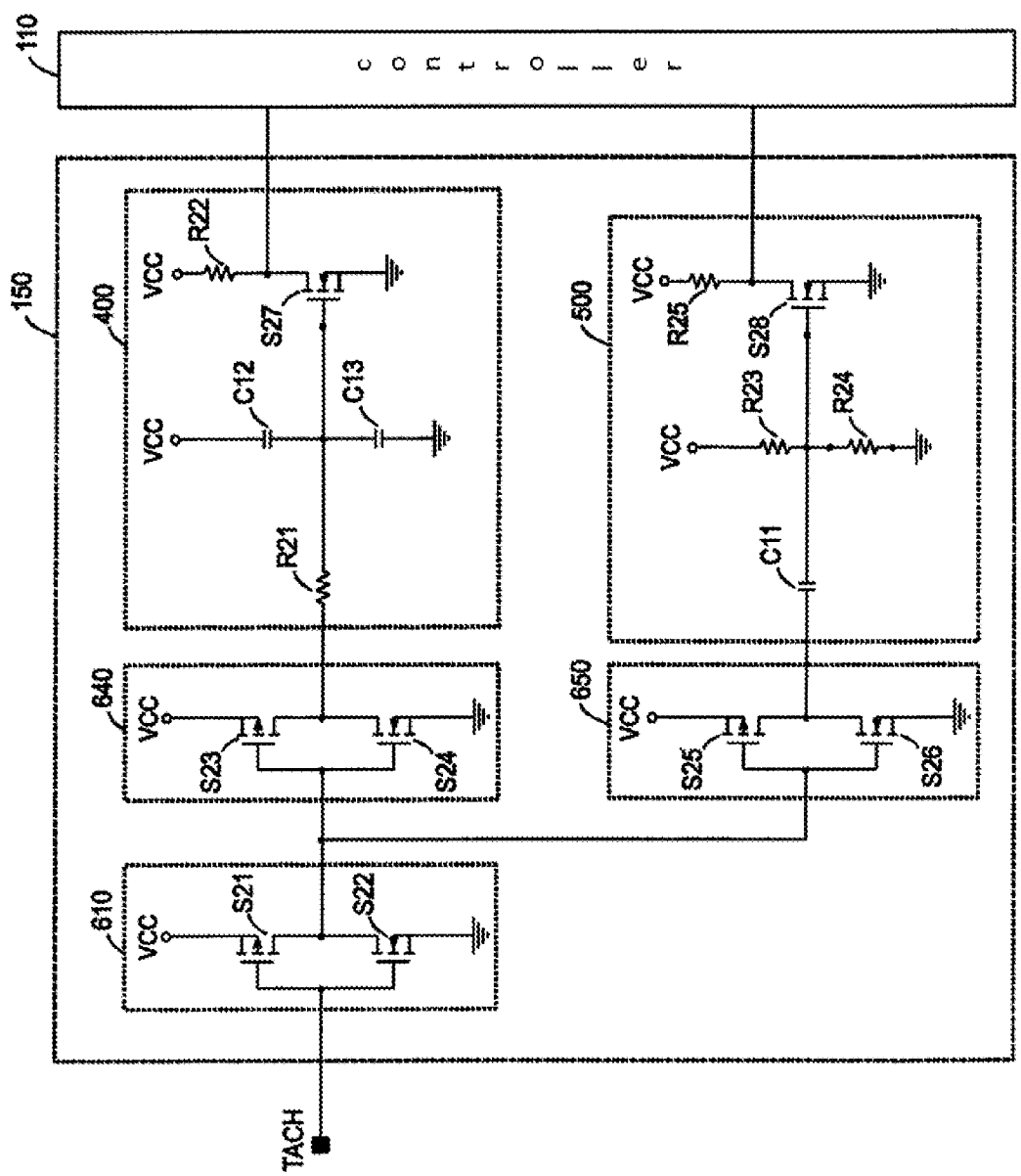
FIG. 5 is a diagram showing an example of a circuit configuration of the demodulating circuit 150 according to the embodiment.

FIG. 3 is a diagram showing an example of the demodulating circuit 150. FIG. 4 is a diagram showing an example of a circuit configuration of the synthesizing circuit 270. FIG. 5 is a diagram showing an example of a circuit configuration of the demodulating circuit 150 shown in FIG. 3. In this example, the demodulating circuit 150 includes a low-pass filter 400 and a high-pass filter 500. The superimposed signal input from the brushless DC motor 200 via the TACH terminal is input to the low-pass filter 400 and the high-pass filter 500. The low-pass filter 400 allows a component having a low frequency of the superimposed signal to pass. The high-pass filter 500 allows a component having a high frequency of the superimposed signal to pass. That is, the TACH signal is able to be separated from the superimposed signal by the low-pass filter 400, and a high frequency signal is able to be separated from the superimposed signal by the high-pass filter 500.

FIG. 6A to FIG. 6E are diagrams showing examples of waveforms of signals. In FIG. 6A to FIG. 6E, the horizontal axis represents time and the vertical axis represents voltage. FIG. 6A shows a waveform of the TACH signal output from the motor drive IC 220 to the synthesizing circuit 270. FIG. 6B shows a waveform of a high frequency signal output from the high frequency generation circuit 280 to the synthesizing circuit 270. FIG. 6C shows a waveform of a superimposed signal that is generated by the synthesizing circuit 270 superimposing a TACH signal and a high frequency signal. FIG. 6D shows a waveform of a high frequency signal that is separated from the superimposed signal by the demodulating circuit 150. FIG. 6E shows a waveform of a TACH signal that is separated from the superimposed signal by the demodulating circuit 150.

In the example shown in FIG. 4, the synthesizing circuit 270 includes a switch element S11 and a resistive element R11 connected in series, a switch element S12 and a resistive element R12 connected in series, a switch element S13 and a resistive element R13 connected in series, a switch element S14 and a resistive element R14 connected in series, a switch element S15 and a resistive element R15 connected in series, a switch element S16 and a resistive element R16 connected in series, a switch element S17 and a resistive element R17 connected in series, a switch element S18, and a switch element S19. The switch elements S11 to S18 are, for example, transistors. The switch elements S11 to S18 are, for example, MOSFETs. The resistance values of the resistive elements R11 to R17 are, for example, about several tens of k Ω. The resistance values of the resistive elements R11 to R17 are, for example, 10 kΩ.

The duty ratio of the high frequency signal generated by the high frequency generation circuit 280 differs for each type of the plurality of brushless DC motors 200. For example, the high frequency generation circuit 280 includes an RC filter circuit. In this case, for example, when the capacitance of the capacitor of the RC filter circuit is able to be arbitrarily set, the duty ratio of the high frequency signal is able to be arbitrarily set. In addition, other methods of setting the duty ratio to an arbitrary value include, for example, a method using an RL filter circuit and a method using an MCU. In addition, regarding other methods of setting the duty ratio to an arbitrary value, a PWM generator to be described below is able to be used.

A TACH signal is supplied to gates of the switch elements S11 and S15 to the motor drive IC 220. The TACH signal in which high and low of the pulse are inverted by the switch element S11 is inverted again by the switch element S12.

A high frequency signal is supplied to gates of the switch elements S14 and S18 from the high frequency generation circuit 280. The high frequency signal in which high and low are inverted by the switch element S18 is supplied to a node to which the drain of the switch element S12 and the gate of the switch element S13 are connected. In this node, the TACH signal and the inverted high frequency signal are superimposed. The superimposed signal of which high and low are inverted by the switch element S13 is supplied to a node to which the drain of the switch element S16 and the gate of the switch element S17 are connected.

High and low of the TACH signal supplied from the motor drive IC 220 to the switch element S15 are inverted by the switch element S15. High and low of the high frequency signal supplied from the high frequency generation circuit 280 to the switch element S14 are inverted by the switch element S14. The inverted high frequency signal is inverted again by the switch element S19. In the node to which the drain of the switch element S15 and the gate of the switch element S16 are connected, the inverted TACH signal and the high frequency signal are superimposed. High and low of the superimposed signal are inverted by the switch element S16.

In the node to which the drain of the switch element S16 and the gate of the switch element S17 are connected, two superimposed signals are synthesized. The synthesized superimposed signal of which high and low are inverted by the switch element S17 is output to the identification device 100 via the TACH terminal.

In the example shown in FIG. 5, the demodulating circuit 150 includes the low-pass filter 400, the high-pass filter 500, and buffers 610, 640, and 650.

In this example, the low-pass filter 400 includes a resistive element R21, capacitors C12 and C13 connected in series, and a switch element S27 and a resistive element R22 connected in series. The high-pass filter 500 includes a capacitor C11, a resistive element R23 and a resistive element R24 connected in series, and a switch element S28 and a resistive element R25 connected in series. The resistance value of the resistive element R21 is, for example, 100 kΩ, but is not limited to this value. The resistance values of the resistive elements R22 to R25 are, for example, 10 kΩ, but are not limited to this value. The capacitance of the capacitor C11 is, for example, 0.1 nF, but is not limited to this value. The capacitances of the capacitors C12 and C13 are, for example, 1 nF, but are not limited to this value.

In addition, in this example, the buffer 610 includes switch elements S21 and S22. The buffer 640 includes switch elements S23 and S24. The buffer 650 includes switch elements S25 and S26. The buffers 610, 640, and 650 have a configuration in which the source of a P channel MOSFET and the drain of an N channel MOSFET are connected and these gates are connected to each other.

The superimposed signal input from the brushless DC motor 200 are input to the low-pass filter 400 via the buffers 610 and 640. The low-pass filter 400 allows a component having a low frequency of the superimposed signal to pass and thus is able to separate the TACH signal from the superimposed signal. The separated TACH signal is inverted by the switch element S27 and input to the controller 110. The controller 110 is able to detect a rotational speed of the brushless DC motor 200 from the TACH signal.

In addition, the superimposed signal input from the brushless DC motor 200 is input to the high-pass filter 500 via the buffers 610 and 650. The high-pass filter 500 allows a component having a high frequency of the superimposed signal to pass and is able to separate the high frequency signal from the superimposed signal. The separated high frequency signal is inverted by the switch element S28 and input to the controller 110.

The controller 110 identifies the type of the brushless DC motor 200 based on the duty ratio of the obtained high frequency signal. The duty ratio is able to be obtained by, for example, totaling times for which the signal is high per unit time. In addition, the duty ratio is able to be obtained using, for example, a Duty detector, a smoothing circuit, and an FV converter. The controller 110 identifies the type of the brushless DC motor 200 from the duty ratio of the obtained high frequency signal with reference to, for example, an identification table.

Figures 7, 8:
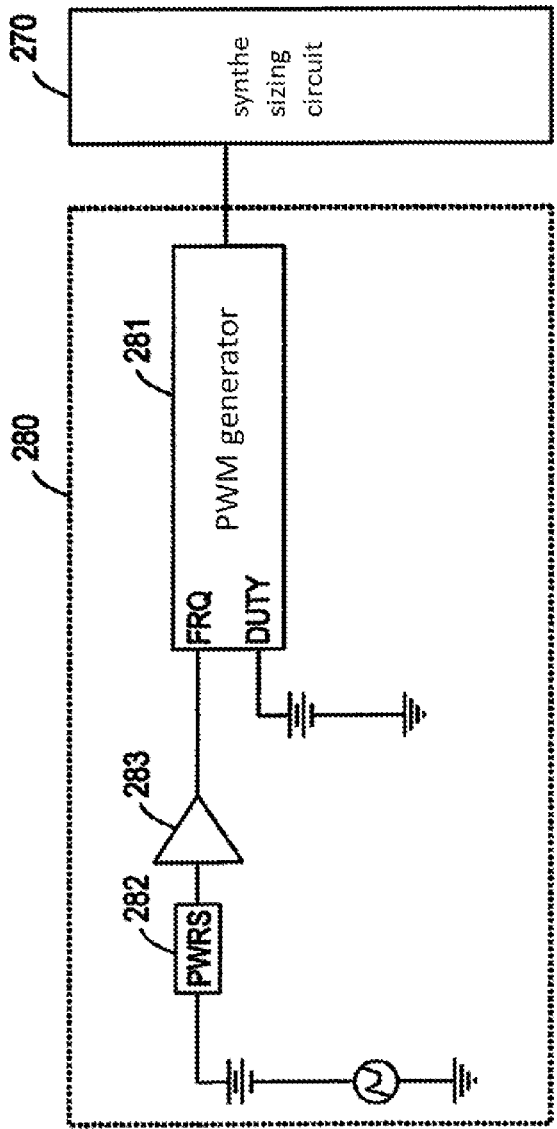
FIG. 7 is a diagram showing an identification table used for identification according to the embodiment.
FIG. 8 is a diagram showing an example of a circuit configuration of a high frequency generation circuit 280 according to the embodiment.

FIG. 7 exemplifies content of the identification table used for identification. The identification table is a look up table (LUT) in which the types of the plurality of brushless DC motors are associated with unique information of the plurality of brushless DC motors. The table is stored in, for example, the memory 120. As described above, for example, there are a plurality of types of brushless DC motors for each supplier and, and for example, there are three types of suppliers, A, B and C. In this example, a duty ratio of 5% is assigned to the supplier A, a duty ratio of 10% is assigned to the supplier B, and a duty ratio of 20% is assigned to the supplier C.

When the obtained duty ratio is about 5%, the controller 110 is able to identify that the connected brushless DC motor is a motor of the supplier A. In addition, when the obtained duty ratio is about 10%, the controller 110 is able to identify that the connected brushless DC motor is a motor of the supplier B. When the obtained duty ratio is about 20%, the controller 110 is able to identify that the connected brushless DC motor is a motor of the supplier C.

In the present embodiment, a signal obtained by superimposing a high frequency signal and a TACH signal used to identify the type of the brushless DC motor 200 is output from the TACH terminal of the brushless DC motor 200. Thereby, information for identifying the type of the brushless DC motor 200 is able to be transmitted from the brushless DC motor 200 to the identification device 100 without increasing the number of wirings between the brushless DC motor 200 and the identification device 100. In the identification device 100, the superimposed signal is separated into a high frequency signal and a TACH signal. The type of the brushless DC motor 200 is able to be identified using a separated high frequency signal.

In addition, in the present embodiment, when power is supplied to the brushless DC motor 200, the superimposed signal is automatically output from the output terminal TACH. The identification device 100 only needs to receive the output signal. Communication by handshaking between the identification device 100 and the brushless DC motor 200, mode switching on the side of the brushless DC motor 200 like that in the related art and the like are unnecessary.

Next, another example of the process of identifying the type of the brushless DC motor 200 will be described.

In this example, the high frequency generation circuit 280 generates a plurality of types of high frequency signals having different frequencies. Then, information that differs for each frequency is assigned. For example, "1" may be assigned to a high frequency signal of 600 kHz and "0" may be assigned to a high frequency signal of 300 kHz. For example, three-state information in which "1", "0", and "no communication" are combined is able to be transmitted from the brushless DC motor 200 to the identification device 100. When "1", "0", and "no communication" are arbitrarily combined, arbitrary information is able to be transmitted from the brushless DC motor 200 to the identification device 100. Examples of information to be transmitted include identification information of the brushless DC motor 200, a serial number, a lot number, an input power, an input current, an input voltage, and a motor temperature of the brushless DC motor 200, and the like. The serial number is able to be used as identification information for identifying the type of the brushless DC motor 200.

FIG. 8 is a diagram showing an example of a circuit configuration of the high frequency generation circuit 280. In the example shown in FIG. 8, the high frequency generation circuit 280 includes a PWM generator 281, a power supply circuit 282, and a buffer 283. The power supply circuit 282 supplies a voltage signal to the PWM generator 281 so that the PWM generator 281 sequentially generates a high frequency signal having a frequency corresponding to information to be transmitted. The power supply circuit 282 may supply a voltage to the PWM generator 281 in a preset pattern, and may supply a voltage to the PWM generator 281 according to a command value from the motor drive IC 220.

The PWM generator 281 sequentially generates a high frequency signal having a frequency corresponding to information to be transmitted. For example, when "1011010" which is an ASCII code of "Z" is transmitted, the PWM generator 281 sequentially generates high frequency signals of 600 Hz, 300 Hz, 600 Hz, 600 Hz, 300 Hz, 600 Hz, and 300 Hz. The synthesizing circuit 270 superimposes the high frequency signal generated by the PWM generator 281 and the TACH signal and outputs the superimposed signal to the identification device 100 via the TACH terminal.

Figure 9:
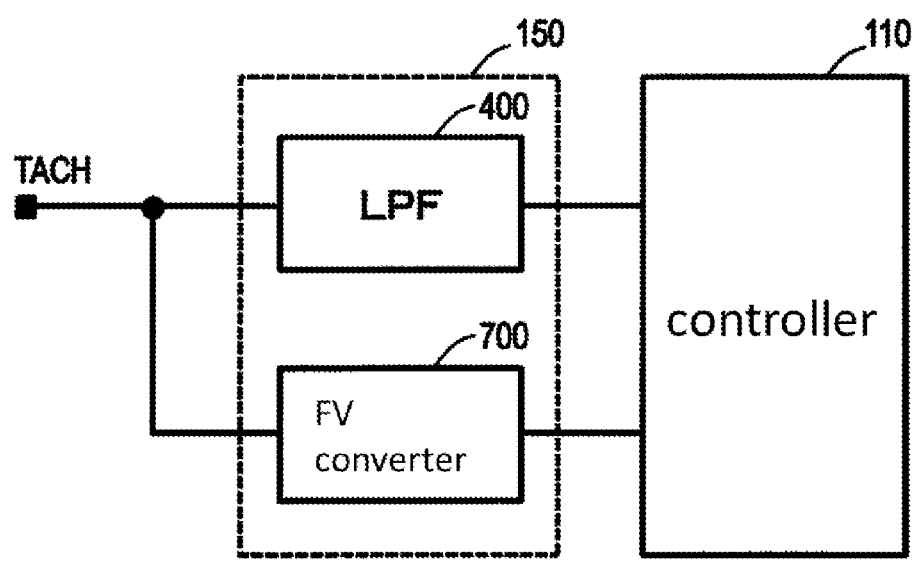
FIG. 9 is a diagram showing the demodulating circuit 150 according to the embodiment.

FIG. 9 is a diagram showing an example of the demodulating circuit 150. In the example shown in FIG. 9, the demodulating circuit 150 includes the low-pass filter 400 and an FV converter 700. The superimposed signal input from the brushless DC motor 200 via the TACH terminal is input to the low-pass filter 400 and the FV converter 700. The FV converter 700 converts the frequency of the high frequency signal separated from the superimposed signal into a voltage. The controller 110 determines "1", "0", and "no communication" from the magnitude of the voltage and thus is able to recognize content of information transmitted from the brushless DC motor 200. For example, the controller 110 is able to identify the type of the brushless DC motor 200 from content of information.

Figure 10:
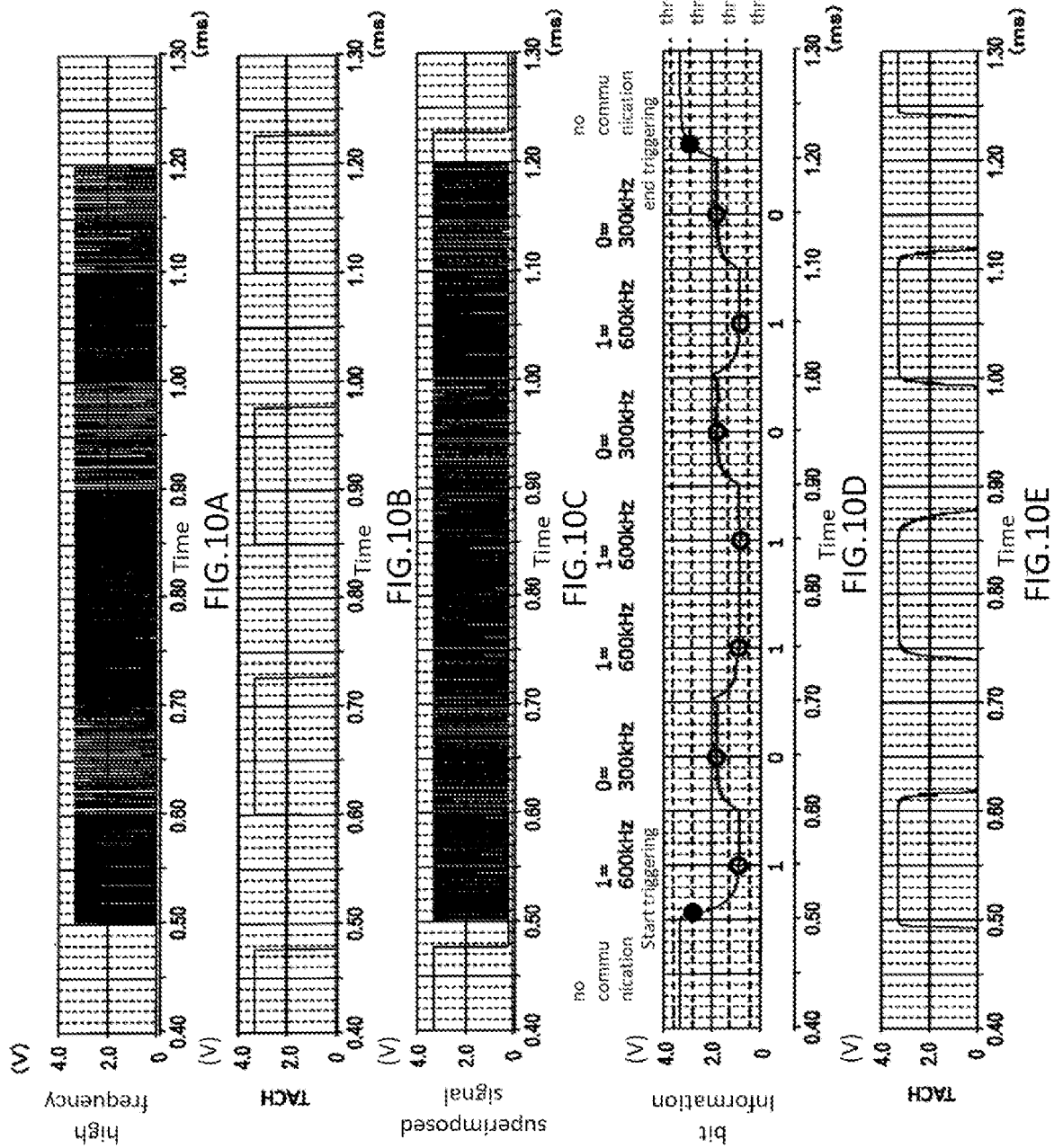
FIG. 10A to FIG. 10E are diagrams showing examples of signal waveforms according to the embodiment.

FIG. 10A to FIG. 10E are diagrams showing examples of waveforms of signals. In FIG. 10A to FIG. 10E, the horizontal axis represents time and the vertical axis represents voltage. FIG. 10A shows a waveform of a high frequency signal (bit information) output from the high frequency generation circuit 280 to the synthesizing circuit 270. FIG. 10B shows a waveform of a TACH signal output from the motor drive IC 220 to the synthesizing circuit 270. FIG. 10C shows a waveform of a superimposed signal that is generated by the synthesizing circuit 270 superimposing the TACH signal and the high frequency signal. FIG. 10D shows a waveform of a voltage signal generated by the FV converter 700. FIG. 10E shows a waveform of a TACH signal that is separated from the superimposed signal by the demodulating circuit 150.

Figure 11:
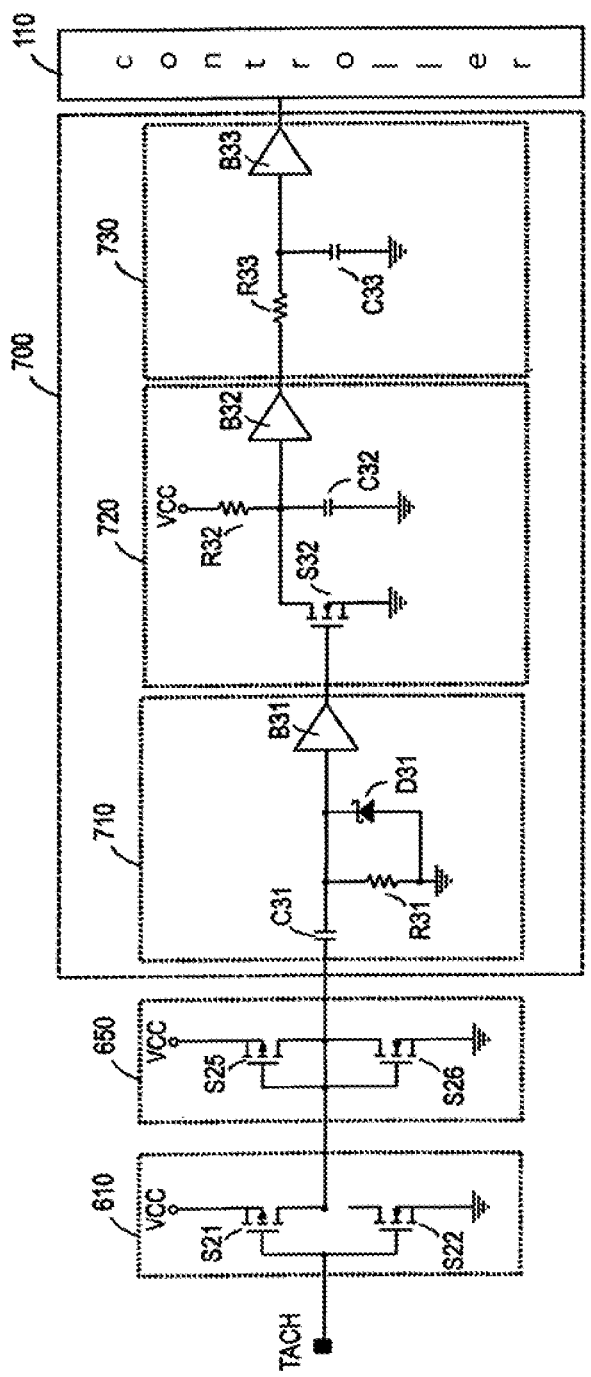
FIG. 11 is a diagram showing an example of a circuit configuration of an FV converter 700 according to the embodiment.

FIG. 11 is a diagram showing an example of a circuit configuration of the FV converter 700. In the example shown in FIG. 11, the FV converter 700 includes a high-pass filter 710, an integrator 720, and a smoothing circuit 730. The high-pass filter 710 includes a capacitor C31, a resistive element R31 and a diode D31 connected in parallel, and a buffer B31. The integrator 720 includes a switch element S32, a resistive element R32 and a capacitor C32 connected in series, and a buffer B32. The smoothing circuit 730 includes a resistive element R33, a capacitor C33, and a buffer B33. The resistance values of the resistive elements R31 to R33 are, for example, 10 kΩ, but are not limited to this value. The capacitance of the capacitor C31 is, for example, 0.01 nF or 0.03 nF, but is not limited to this value. The capacitance of the capacitor C32 is, for example, 0.1 nF, but is not limited to this value. The capacitance of the capacitor C33 is, for example, 0.5 nF or 1 nF, but is not limited to this value.

The superimposed signal input from the brushless DC motor 200 is input to the FV converter 700 via the TACH terminal and the buffers 610 and 650. The high-pass filter 710 allows a component having a high frequency of the superimposed signal to pass and separates the high frequency signal from the superimposed signal. The separated high frequency signal is integrated by the integrator 720. The output signal of the integrator 720 is smoothed by the smoothing circuit 730 and input to the controller 110 as a voltage signal.

FIG. 10D shows a voltage signal input from the FV converter 700 to the controller 110.

When the voltage level of the voltage signal is between the threshold value 1 and the threshold value 2, the controller 110 determines that there is no communication. When the voltage level of the voltage signal is between the threshold value 2 and the threshold value 3, the bit is determined as "0". When the voltage level of the voltage signal is between the threshold value 3 and the threshold value 4, the bit is determined as "1".

When the state without communication changes to the state with communication, the voltage level of the voltage signal changes across threshold value 2. Using such a change in the voltage level as a trigger, the controller 110 is able to detect start of communication. In addition, synchronous communication between the brushless DC motor 200 and the identification device 100 is also possible using a change in the voltage level as a trigger. In the drawing, a timing for start triggering and a timing for end triggering are indicated by black circles, and a timing at which a voltage level is detected is indicated by white circles.

The controller 110 detects a voltage level at predetermined time intervals for bit rates and determines "0", "1", or "no communication". When the bit rate is determined in advance, information is able to be detected with high accuracy.

In addition, the controller 110 may detect a voltage level in the latter half of such time intervals for bit rates. Immediately after the voltage level changes, the voltage level may not have sufficiently changed. Thus, when the voltage level is detected in the latter half of the time for which the voltage level is stabilized, the voltage level is able to be detected with high accuracy.

In the above example, the state in which a signal in which a high frequency signal is superimposed is not input from the brushless DC motor 200 is defined as "no communication" of the three states, but a high frequency signal having a specific frequency may be assigned for "no communication". For example, "0" may be assigned to a high frequency signal of 40 kHz, "1" may be assigned to a high frequency signal of 50 kHz, and "no communication" may be assigned to a high frequency signal of 60 kHz.

Figures 12, 13:
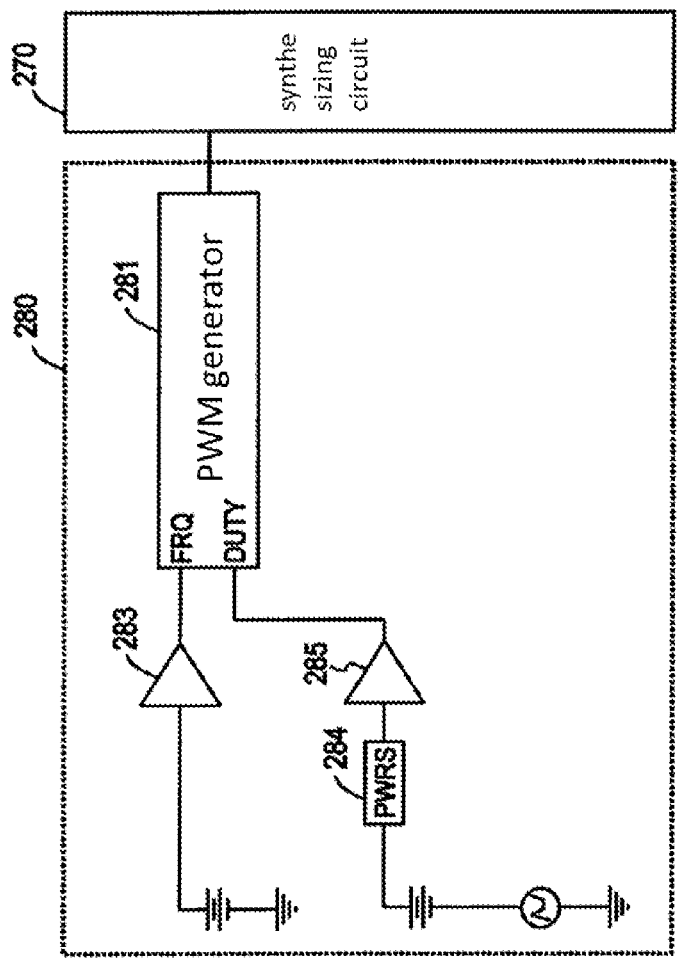
FIG. 12 is a diagram showing an identification table used for identification according to the embodiment.
FIG. 13 is a diagram showing an example of a circuit configuration of the high frequency generation circuit 280 according to the embodiment.

In addition, a high frequency signal having a frequency different for each type of the plurality of brushless DC motors 200 may be assigned. In this case, the controller 110 is able to identify the type of the brushless DC motor 200 based on the frequency of the obtained high frequency signal. FIG. 12 exemplifies content of the identification table used for identification. The identification table is a look up table (LUT) in which the types of the plurality of brushless DC motors are associated with unique information of the plurality of brushless DC motors. In this example, a frequency of 40 kHz is assigned to the supplier A, a frequency 50 kHz is assigned to the supplier B, and a frequency of 60 kHz is assigned to the supplier C.

When the obtained frequency is about 40 kHz, the controller 110 is able to identify that the connected brushless DC motor is a motor of the supplier A. In addition, when the obtained frequency is about 50 kHz, the controller 110 is able to identify that the connected brushless DC motor is a motor of the supplier B. When the obtained frequency is about 60 kHz, the controller 110 is able to identify that the connected brushless DC motor is a motor of the supplier C.

Here, in the embodiment using the FV converter 700, the controller 110 is able to determine a frequency of the high frequency signal from the voltage level of the output signal of the FV converter 700. In addition, in the identification table, a voltage level of the output signal of the FV converter 700 may be assigned to each supplier. Such a configuration is also included in the embodiment in which the type of the brushless DC motor 200 is identified based on the frequency of the high frequency signal.

Next, still another example of a process of identifying the type of the brushless DC motor 200 will be described.

In this example, the high frequency generation circuit 280 generates a plurality of types of high frequency signals having different duty ratios. Then, information that differs for each duty ratio is assigned. For example, "1" is assigned to a duty ratio of 40%, and "0" is assigned to a duty ratio of 10%. For example, three-state information in which "1", "0", and "no communication" are combined is able to be transmitted from the brushless DC motor 200 to the identification device 100. When "1", "0", and "no communication" are arbitrarily combined, arbitrary information is able to be transmitted from the brushless DC motor 200 to the identification device 100. Examples of information to be transmitted include identification information of the brushless DC motor 200, a serial number, a lot number, an input power, an input current, an input voltage, and a motor temperature of the brushless DC motor 200, and the like. The serial number is able to be used as identification information for identifying the type of the brushless DC motor 200.

FIG. 13 is a diagram showing an example of a circuit configuration of the high frequency generation circuit 280. In the example shown in FIG. 13, the high frequency generation circuit 280 includes the PWM generator 281, a power supply circuit 284, and the buffers 283 and 285. The power supply circuit 284 supplies a voltage signal to the PWM generator 281 so that the PWM generator 281 sequentially generates a high frequency signal having a duty ratio corresponding to information to be transmitted. The power supply circuit 284 may supply a voltage to the PWM generator 281 in a preset pattern and may supply a voltage to the PWM generator 281 according to a command value from the motor drive IC 220.

The PWM generator 281 sequentially generates a high frequency signal having a duty ratio corresponding to information to be transmitted. For example, when "1011010" which is an ASCII code of "Z" is transmitted, the PWM generator 281 sequentially generates high frequency signals having a duty ratio of 40%, 10%, 40%, 40%, 10%, 40%, and 10%. The synthesizing circuit 270 superimposes the high frequency signal generated by the PWM generator 281 and the TACH signal and outputs the superimposed signal to the identification device 100 via the TACH terminal.

Figure 14:
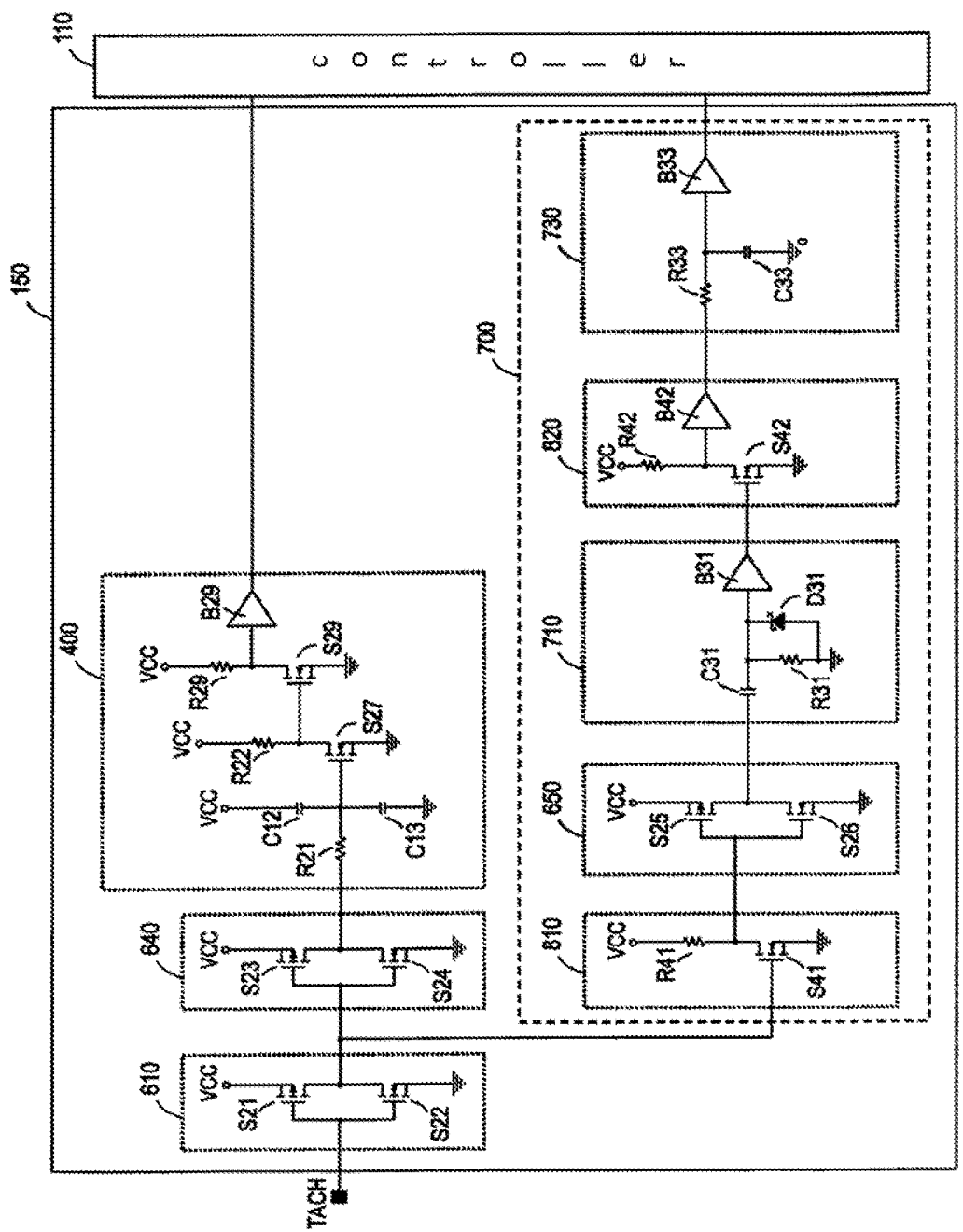
FIG. 14 is a diagram showing an example of a circuit configuration of the demodulating circuit 150 according to the embodiment.

FIG. 14 is a diagram showing an example of a circuit configuration of the demodulating circuit 150. In the example shown in FIG. 14, the FV converter 700 converts the duty ratio of the high frequency signal separated from the superimposed signal into a voltage. The controller 110 determines "1", "0", and "no communication" from the magnitude of the voltage and thus is able to recognize content of information transmitted from the brushless DC motor 200. For example, the controller 110 is able to identify the type of the brushless DC motor 200 from content of information.

Figure 15A:
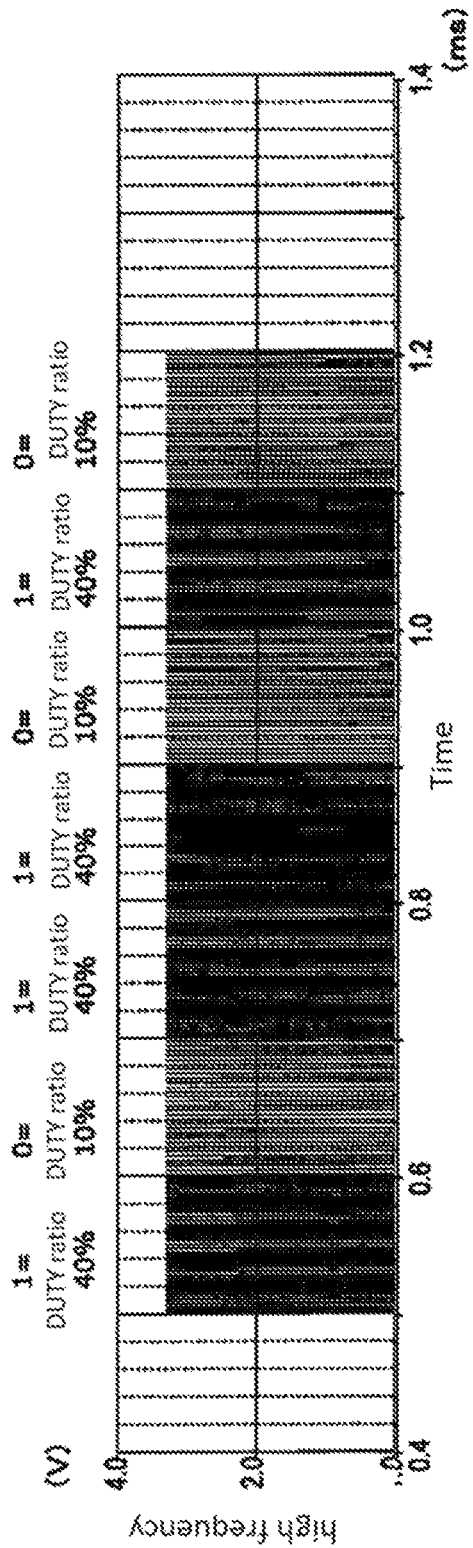
FIG. 15A and FIG. 15B are diagrams showing examples of signal waveforms according to the embodiment.
Figure 15B:
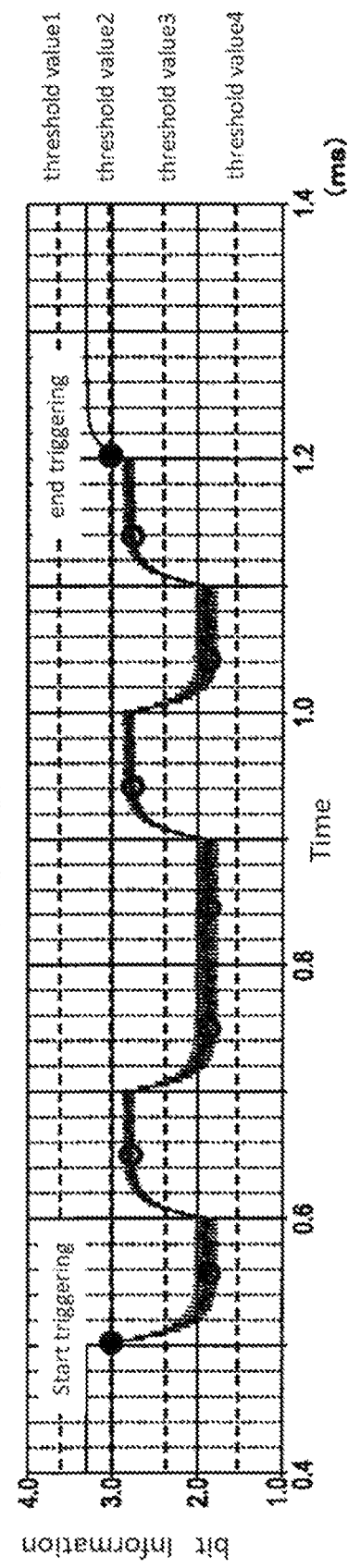

FIG. 15A and FIG. 15B are diagrams showing examples of waveforms of signals. In FIG. 15A and FIG. 15B, the horizontal axis represents time and the vertical axis represents voltage. FIG. 15A shows a waveform of a high frequency signal (bit information) output from the high frequency generation circuit 280 to the synthesizing circuit 270. FIG. 15B shows a waveform of a voltage signal (bit information) generated by the FV converter 700.

In the example shown in FIG. 14, the low-pass filter 400 includes the resistive element R21, the capacitors C12 and C13 connected in series, the switch element S27 and the resistive element R22 connected in series, the switch element S29 and a resistive element R29 connected in series, and a buffer B29. The superimposed signal input from the brushless DC motor 200 is input to the low-pass filter 400 via the buffers 610 and 640. The low-pass filter 400 separates the TACH signal from the superimposed signal. The separated TACH signal is inverted twice by the switch elements S27 and S29 and input to the controller 110.

In the example shown in FIG. 14, the FV converter 700 includes the high-pass filter 710, the smoothing circuit 730, the buffer 650, and inverting circuits 810 and 820. The inverting circuit 810 includes a switch element S41 and a resistive element R41 connected in series. The inverting circuit 820 includes a switch element S42 and a resistive element R42 connected in series, and a buffer B42.

The superimposed signal input from the brushless DC motor 200 is input to the high-pass filter 710 via the TACH terminal, the buffer 610, the inverting circuit 810, and the buffer 650. The high-pass filter 710 separates the high frequency signal from the superimposed signal. The separated high frequency signal is inverted by the inverting circuit 820. The output signal of the inverting circuit 820 is smoothed by the smoothing circuit 730 and input to the controller 110 as a voltage signal.

Figure 16:
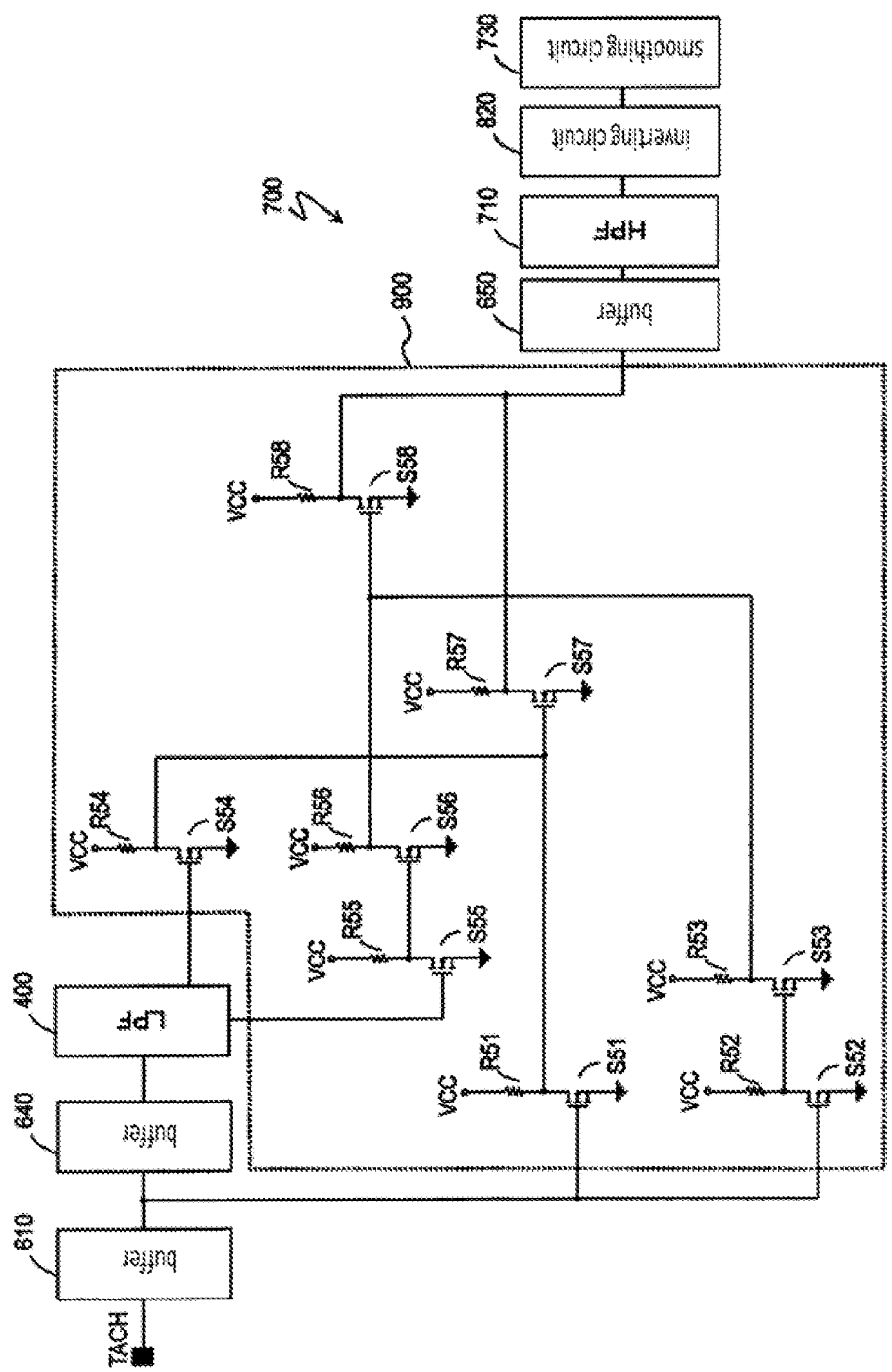
FIG. 16 is a diagram showing an example of a circuit configuration of the FV converter 700 according to the embodiment.

FIG. 16 is a diagram showing a modified example of the FV converter 700 shown in FIG. 14. In the example shown in FIG. 16, the FV converter 700 includes a phase restoration circuit 900. When the TACH signal is high or low, the duty ratio of bit information is reversed, that is, the phase is inverted. Therefore, when bit information is transmitted without distinguishing high and low of the TACH signal, a circuit for restoring the phase is required. Here, when bit information is transmitted only at a timing at which the TACH signal is any of high and low, such a phase restoration circuit may not be necessary.

In the example shown in FIG. 16, the phase restoration circuit 900 includes switch elements S51 to S58 and resistive elements R51 to R58.

The switch element S51 inverts the superimposed signal. The switch element S54 inverts the TACH signal output from the low-pass filter 400. The inverted superimposed signal and the inverted TACH signal are additionally inverted by the switch element S57.

The switch elements S52 and S53 invert the superimposed signal twice. The switch elements S55 and S56 invert the TACH signal output from the low-pass filter 400 twice. The superimposed signal inverted twice and the TACH signal inverted twice are additionally inverted by the switch element S58.

The signal inverted by the switch element S57 and the signal inverted by the switch element S58 are superimposed. The superimposed signal is input to the high-pass filter 710 via the buffer 650. The subsequent process is the same as the process described with reference to FIG. 14

FIG. 15B shows a voltage signal input from the FV converter 700 to the controller 110. When the voltage level of the voltage signal is between the threshold value 1 and the threshold value 2, the controller 110 determines that there is no communication. When the voltage level of the voltage signal is between the threshold value 2 and the threshold value 3, the bit is determined as "0". When the voltage level of the voltage signal is between the threshold value 3 and the threshold value 4, the bit is determined as "1".

When the state without communication is changed to the state with communication, the voltage level of the voltage signal changes across threshold value 2. Using such a change in the voltage level as a trigger, the controller 110 is able to detect start of communication. In addition, synchronous communication between the brushless DC motor 200 and the identification device 100 is also possible using a change in the voltage level as a trigger. In the drawing, a timing for start triggering and a timing for end triggering are indicated by black circles, and a timing at which a voltage level is detected is indicated by white circles.

The controller 110 detects a voltage level at predetermined time intervals for bit rates and determines "0", "1", or "no communication". When the bit rate is determined in advance, information is able to be detected with high accuracy In addition, the controller 110 may detect a voltage level in the latter half of such time intervals for bit rates. Immediately after the voltage level changes, the voltage level may not have sufficiently changed. Thus, when the voltage level is detected in the latter half of the time for which the voltage level is stabilized, the voltage level is able to be detected with high accuracy. When the detection time is set in the latter half, even if the time interval for bit rates is shortened, information is able to be obtained stably. In the example shown in FIG. 15, the bit rate is 0.1 mS. Although the bit information voltage is being changed until the duty ratio changes to about 0.03 mS, since the detection time is 0.05 mS in the center, information is obtained stably. Here, for example, when the time for the bit rate is 0.04 mS and the detection time is 0.02 mS in the center, the detection time is a time for which the bit information voltage is being changed. However, when the detection time is in the latter half, for example, 0.03 mS, information is able to be obtained stably.

In the above example, the state in which a signal in which a high frequency signal is superimposed is not input from the brushless DC motor 200 is defined as "no communication" of the three states, but a high frequency signal having a specific frequency may be assigned for "no communication". For example, "0" may be assigned to a high frequency signal with a duty ratio of 5%, "1" may be assigned to a high frequency signal with a duty ratio of 10%, and "no communication" may be assigned to a high frequency signal with a duty ratio of 20%.

Next, a modified example of the embodiment in which a duty ratio differs for each type of the plurality of brushless DC motors 200 will be described.

In the synthesizing circuit 270 exemplified in FIG. 4, when the TACH signal is high, the high frequency signal is inverted and output, and when the TACH signal is low, the high frequency signal is output without being inverted. Here, when the TACH signal is high, the high frequency signal is output without being inverted and when the TACH signal is low, the high frequency signal may be inverted and output. The synthesizing circuit 270 shown in FIG. 4 outputs a high frequency signal at both times when the TACH signal is high and low. Therefore, the identification device 100 is able to acquire a high frequency signal in an arbitrary region of the superimposed signal.

On the other hand, the identification device 100 acquires a high frequency signal at a time when the TACH signal is low, but the synthesizing circuit 270 is able to be made simpler in the embodiment in which the high frequency signal is not acquired at a time when the TACH signal is high.

Figure 17:
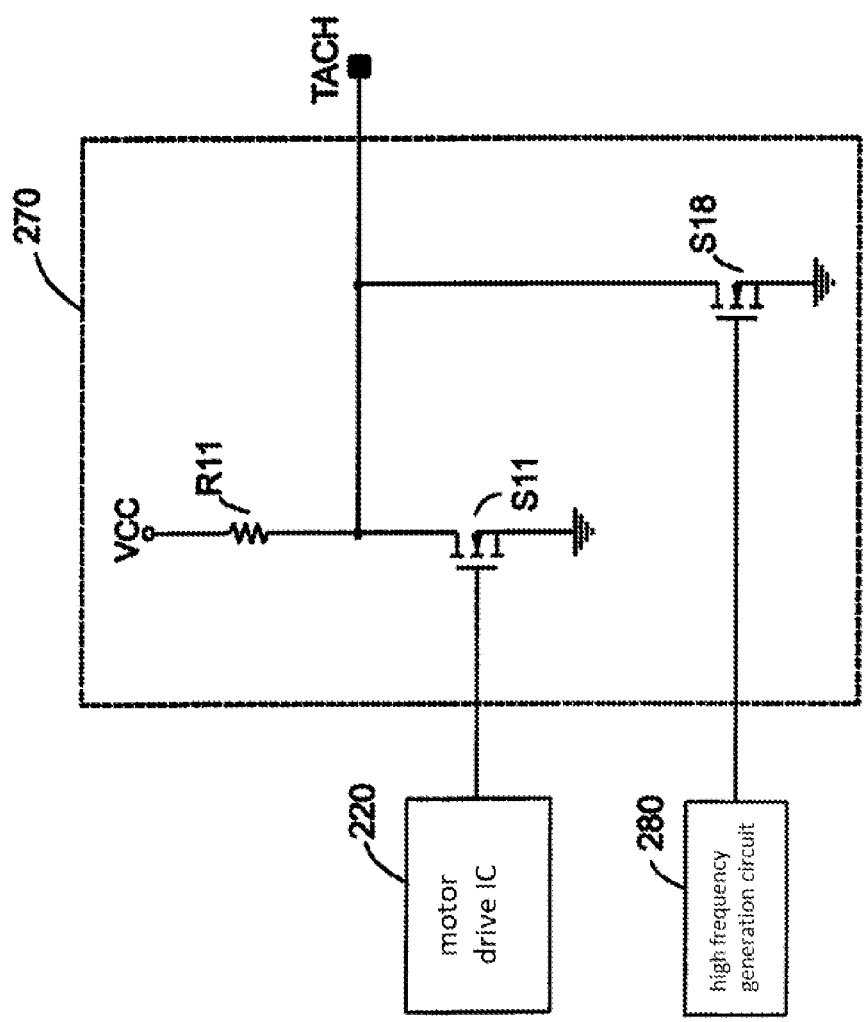
FIG. 17 is a diagram showing an example of a circuit configuration of the synthesizing circuit 270 according to the embodiment.

FIG. 17 is a diagram showing a modified example of the synthesizing circuit 270. In the example shown in FIG. 17, the switch element S18 inverts the high frequency signal output from the high frequency generation circuit 280. At a time when the TACH signal output from the motor drive IC 220 is low, the inverted high frequency signal is superimposed on a signal flowing between the resistive element R11 and the TACH terminal. The superimposed signal is output to the identification device 100 via the TACH terminal.

Figure 18A:
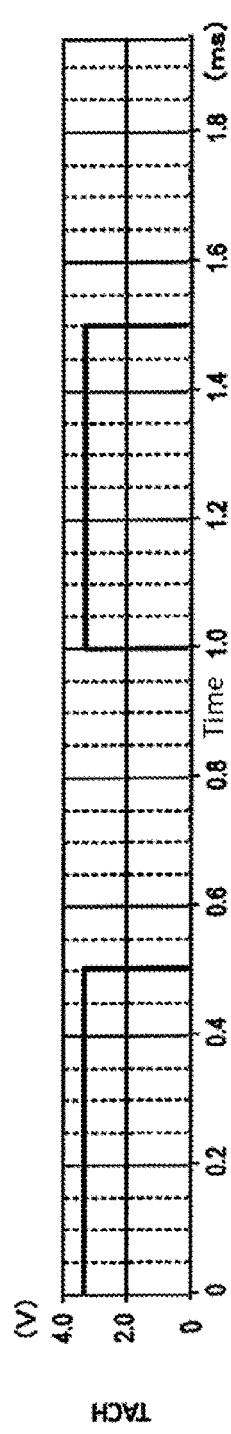
FIG. 18A to FIG. 18E are diagrams showing examples of signal waveforms according to the embodiment.
Figure 18B:
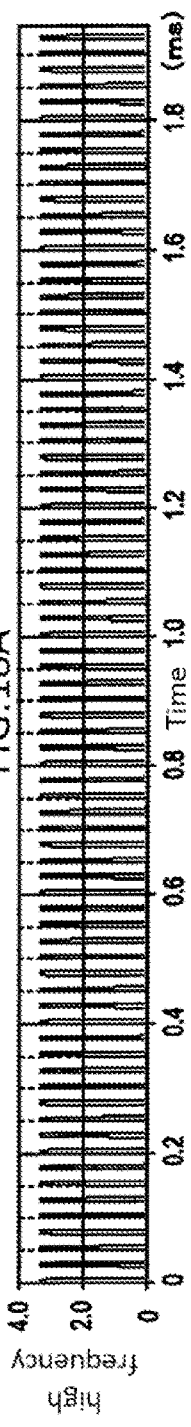
Figure 18C:
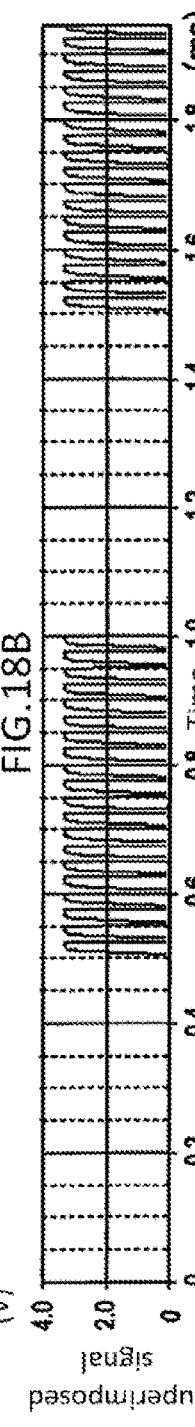
Figure 18D:
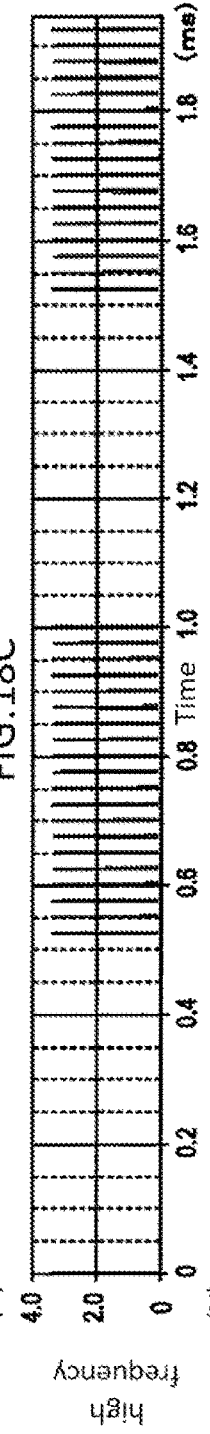
Figure 18E:
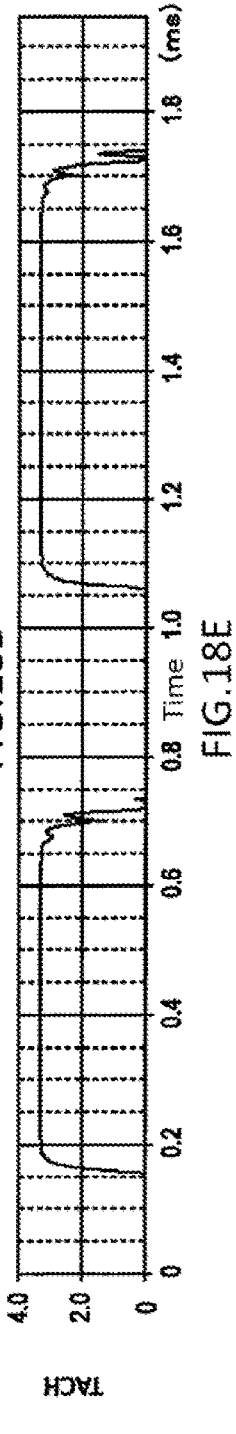

FIG. 18A to FIG. 18E are diagrams showing examples of waveforms of signals. In FIG. 18A to FIG. 18E, the horizontal axis represents time and the vertical axis represents voltage. FIG. 18A shows a waveform of the TACH signal output from the motor drive IC 220 to the synthesizing circuit 270. FIG. 18B shows a waveform of a high frequency signal output from the high frequency generation circuit 280 to the synthesizing circuit 270. FIG. 18C shows a waveform of a superimposed signal that is generated by the synthesizing circuit 270 superimposing a TACH signal and a high frequency signal. FIG. 18D shows a waveform of a high frequency signal that is separated from the superimposed signal by the demodulating circuit 150. FIG. 18E shows a waveform of a TACH signal that is separated from the superimposed signal by the demodulating circuit 150.

When the synthesizing circuit 270 shown in FIG. 17 is used, as shown in FIG. 18E, noise at the rising part of the TACH signal separated from the superimposed signal is reduced. When noise is reduced, the identification device 100 is able to easily use the rising part of the TACH signal as a trigger.

Figure 19:
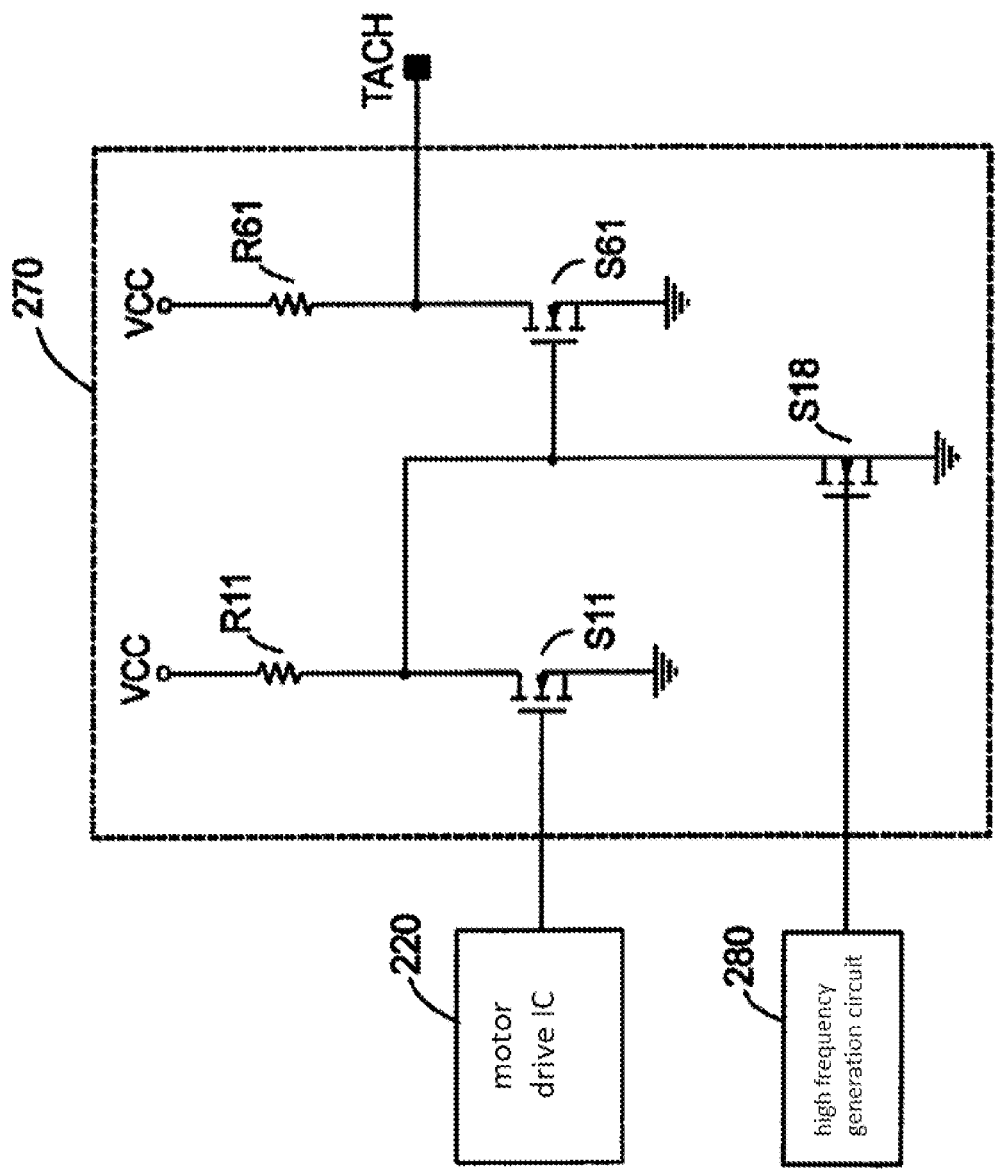
FIG. 19 is a diagram showing an example of a circuit configuration of the synthesizing circuit 270 according to the embodiment.

FIG. 19 is a diagram showing another modified example of the synthesizing circuit 270. Compared to the synthesizing circuit 270 shown in FIG. 17, the synthesizing circuit 270 shown in FIG. 19 further includes a switch element S61 and a resistive element R61 connected in series.

In the example shown in FIG. 19, the switch element S18 inverts the high frequency signal output from the high frequency generation circuit 280. At a time when the TACH signal output from the motor drive IC 220 is low, the inverted high frequency signal is superimposed on a signal flowing between the resistive element R11 and the gate of a switch element S61. The superimposed signal is inverted by the switch element S61. The inverted superimposed signal is output to the identification device 100 via the TACH terminal.

Figure 20A:
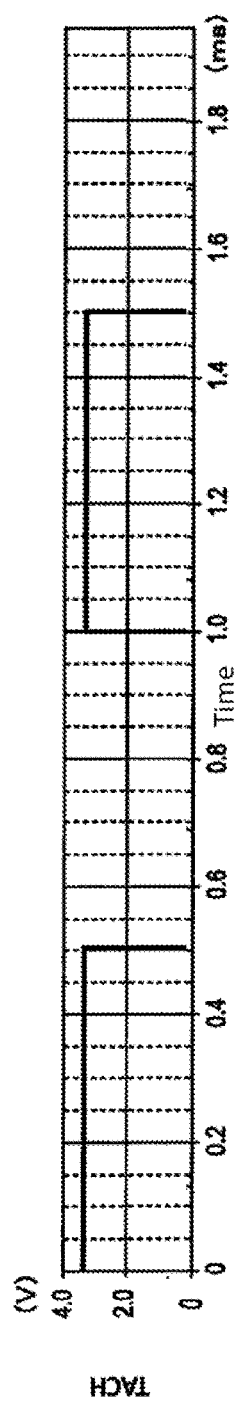
FIG. 20A to FIG. 20E are diagrams showing examples of signal waveforms according to the embodiment.
Figure 20B:
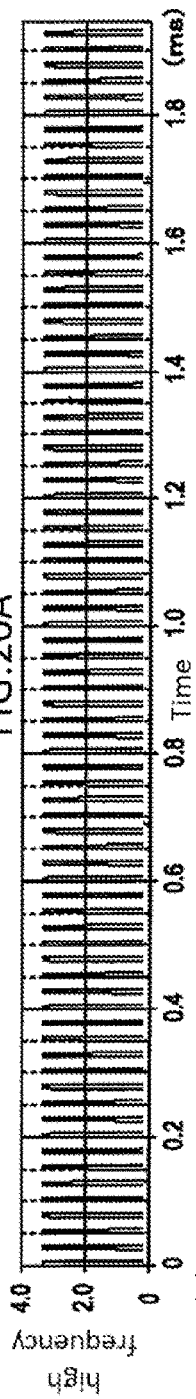
Figure 20C:
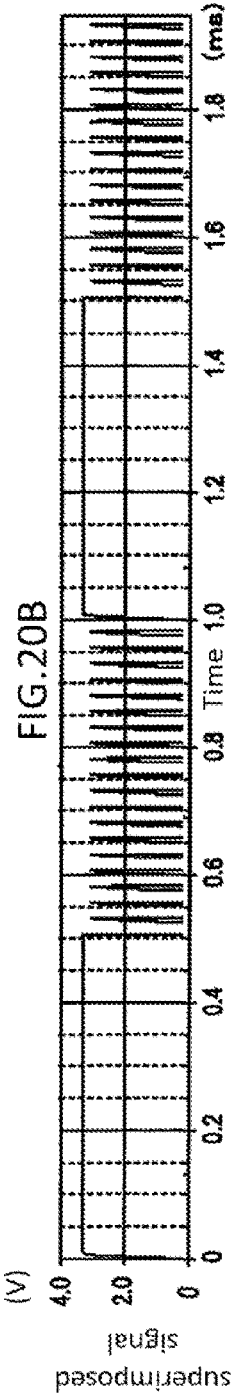
Figure 20D:
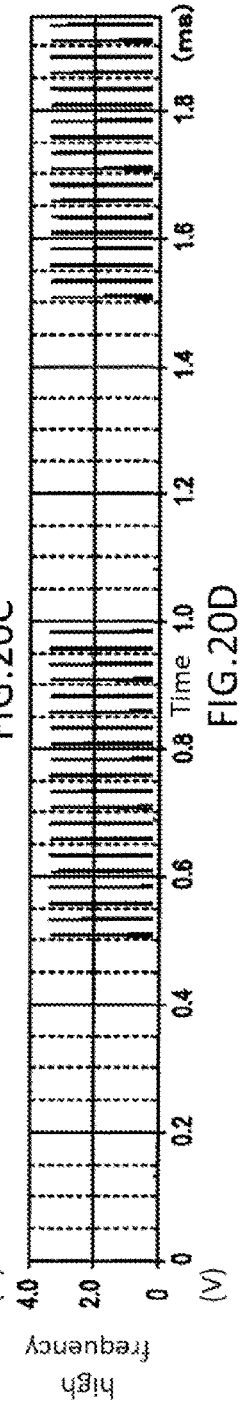
Figure 20E:
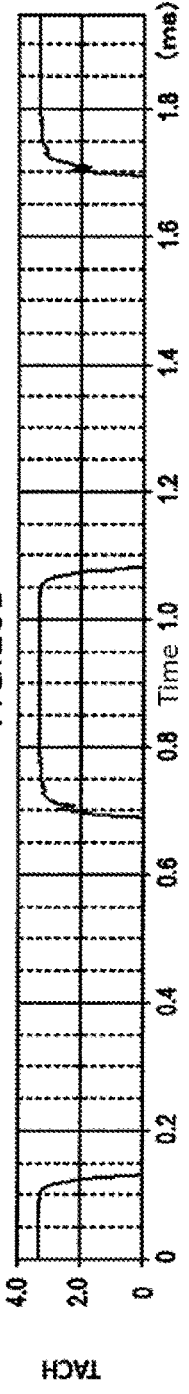

FIG. 20A to FIG. 20E are diagrams showing examples of waveforms of signals. In FIG. 20A to FIG. 20E, the horizontal axis represents time and the vertical axis represents voltage. FIG. 20A shows a waveform of the TACH signal output from the motor drive IC 220 to the synthesizing circuit 270. FIG. 20B shows a waveform of the high frequency signal output from the high frequency generation circuit 280 to the synthesizing circuit 270. FIG. 20C shows a waveform of a superimposed signal that is generated by the synthesizing circuit 270 superimposing a TACH signal and a high frequency signal. FIG. 20D shows a waveform of a high frequency signal that is separated from the superimposed signal by the demodulating circuit 150. FIG. 20E shows a waveform of a TACH signal that is separated from the superimposed signal by the demodulating circuit 150.

When the synthesizing circuit 270 shown in FIG. 19 is used, as shown in FIG. 20E, noise at the falling part of the TACH signal separated from the superimposed signal is reduced. When noise is reduced, the identification device 100 is able to easily use the falling part of the TACH signal as a trigger.

In the above embodiment, the user system 100 operates as an identification device, but the user system 100 and the identification device may be separate devices. In this case, the identification device is electrically connected to the user system 100 and the brushless DC motor 200 via, for example, a test point. A dedicated probe is connected to the identification device and the type of the brushless DC motor 200 is able to be identified by applying the probe to TP. In addition, information output from the brushless DC motor 200 is able to be detected.

The embodiments of the present disclosure have been described above. The overview of the embodiment of the present disclosure will be described below.

The identification method according to the embodiment is an identification method used for the identification device 100, including identifying a type of the brushless DC motor 200. The brushless DC motor 200 includes an output terminal (TACH terminal) for outputting a signal, and the output terminal is able to output a signal in which signals of a plurality of types are superimposed. The superimposed signal differs for each type of the plurality of brushless DC motors 200. In the identification method, power is supplied to the brushless DC motor 200, the superimposed signal output from the output terminal of the brushless DC motor 200 is input to the identification device 100, the superimposed signal is separated into signals of a plurality of types, and the type of the brushless DC motor 200 is identified using a separated signal.

A signal obtained by superimposing a signal used for identifying the type of the brushless DC motor 200 on another signal is output from the brushless DC motor 200. Without increasing the number of wirings between the brushless DC motor 200 and the identification device 100, information for identifying the type of the brushless DC motor 200 is able to be transmitted from the brushless DC motor 200 to the identification device 100. In the identification device 100, when the superimposed signal is separated into signals of a plurality of types, the type of the brushless DC motor 200 is able to be identified.

In certain embodiments, the separated signal is a unique signal that differs for each type of the plurality of brushless DC motors 200, and the type of the brushless DC motor 200 is identified using a table showing the relationship between a plurality of types of unique signals and a plurality of types of brushless DC motors 200.

The type of the brushless DC motor 200 is able to be easily identified from the unique signal using the table.

In certain embodiments, the output terminal is a TACH terminal that outputs a pulse signal (TACH signal) used for detecting a rotational speed of the brushless DC motor 200. High frequency signals are superimposed on the pulse signal, the duty ratio of the high frequency signal differs for each type of the plurality of brushless DC motors 200, the high frequency signals are separated from the superimposed signal, and the type of the brushless DC motor 200 is identified using the duty ratio of the high frequency signals.

When the duty ratio of the high frequency signal is set to be different for each type of the motors, the type of the brushless DC motor 200 is able to be identified with a simple and inexpensive circuit configuration.

In certain embodiments, the output terminal is a TACH terminal that outputs a pulse signal used for detecting a rotational speed of the brushless DC motor 200. A plurality of types of high frequency signals having different duty ratios are superimposed on the pulse signal, different types of information are assigned to the plurality of types of high frequency signals, the plurality of types of high frequency signals are separated from the superimposed signal, and the type of the brushless DC motor 200 is identified using the duty ratio of the plurality of types of high frequency signals.

When a plurality of types of information are assigned to the plurality of types of high frequency signals having different duty ratios and the information is extracted, the type of the brushless DC motor 200 is able to be identified with a simple and inexpensive circuit configuration.

In certain embodiments, the output terminal is a TACH terminal that outputs a pulse signal used for detecting a rotational speed of the brushless DC motor 200. High frequency signals are superimposed on the pulse signal, the frequency of the high frequency signal differs for each type of the plurality of brushless DC motors 200, the high frequency signals are separated from the superimposed signal, and the type of the brushless DC motor 200 is identified using the frequency of the high frequency signals.

When the frequency of the high frequency signal is set to be different for each type of the motors, the type of the brushless DC motor 200 is able to be identified with a simple and inexpensive circuit configuration.

In certain embodiments, the output terminal is a TACH terminal that outputs a pulse signal used for detecting a rotational speed of the brushless DC motor 200. A plurality of types of high frequency signals having different frequencies are superimposed on the pulse signal, different types of information are assigned to the plurality of types of high frequency signals, the plurality of types of high frequency signals are separated from the superimposed signal, and the type of the brushless DC motor 200 is identified using the frequencies of the plurality of types of high frequency signals.

When a plurality of types of information are assigned to the plurality of types of high frequency signals having different frequencies and the information is extracted, the type of the brushless DC motor 200 is able to be identified with a simple and inexpensive circuit configuration.

In certain embodiments, the frequency of the high frequency signal is converted into a voltage, and start of communication from the brushless DC motor 200 is detected according to change in the voltage.

For example, if an FV converter is used, when the state without communication changes to the state with communication, the output of the FV converter changes across a predetermined threshold value. Using such a change in the output as a trigger, the reception side is able to detect start of communication and synchronous communication is possible.

In certain embodiments, the frequency of the high frequency signal is converted into a voltage, and the level of the voltage is detected at predetermined time intervals for bit rates.

When the bit rate is determined in advance, required information is able to be detected with high accuracy.

In certain embodiments, the level of the voltage is detected in the latter half of the time intervals for bit rates.

When the changed voltage level is stabilized and detected, the level of the voltage is able to be detected with high accuracy.

In certain embodiments, the frequency of the high frequency signal is 40 times or more a frequency of the pulse signal when the brushless DC motor 200 operates at a maximum rotational speed.

When the frequency of the pulse signal is set to be different from the frequency of the high frequency signal by a factor of 40 or more, the pulse signal and the high frequency signal is able to be easily separated with high accuracy.

In certain embodiments, the brushless DC motor 200 is a fan motor including an impeller.

Without increasing the number of wirings between the fan motor and the identification device 100, information for identifying the type of the fan motor is able to be transmitted from the fan motor to the identification device 100.

In certain embodiments, power is supplied to the brushless DC motor 200 from the identification device 100.

When power is supplied to the brushless DC motor 200, the superimposed signal is automatically output from the output terminal. The identification device 100 only needs to receive the output signal. Unlike the related art, communication by handshaking between the identification device 100 and the brushless DC motor 200, mode switching on the side of the brushless DC motor 200, and the like are unnecessary.

The brushless DC motor 200 according to the embodiment includes an output terminal (TACH terminal) for outputting a signal, and the output terminal is able to output a signal in which signals of a plurality of types are superimposed. The superimposed signal differs for each type of the plurality of brushless DC motors 200. The identification device 100 that identifies the type of the brushless DC motor 200 includes a power supply terminal for supplying power to the brushless DC motor 200, an input terminal that is electrically connected to the output terminal of the brushless DC motor 200, the demodulating circuit 150 that separates the superimposed signal into signals of a plurality of types, and the controller 110 that identifies the type of the brushless DC motor 200. The identification device 100 acquires the superimposed signal output from the output terminal when power is supplied to the brushless DC motor 200 from the power supply terminal. The demodulating circuit 150 separates the superimposed signal into signals of a plurality of types. The controller 110 identifies the type of the brushless DC motor 200 using the separated signal.

A signal obtained by superimposing a signal used for identifying the type of the brushless DC motor 200 on another signal is output from the brushless DC motor 200. Without increasing the number of wirings between the brushless DC motor 200 and the identification device 100, information for identifying the type of the brushless DC motor 200 is able to be transmitted from the brushless DC motor 200 to the identification device 100. In the identification device 100, when the superimposed signal is separated into signals of a plurality of types, the type of the brushless DC motor 200 is able to be identified.

The brushless DC motor 200 according to the embodiment includes the drive circuit 210 that generates a signal in which signals of a plurality of types are superimposed, a TACH terminal for outputting the superimposed signal, and a power supply terminal Vmot for inputting power. The superimposed signal differs for each type of the plurality of brushless DC motors 200. When power is input via the power supply terminal Vmot, the drive circuit 210 outputs the superimposed signal to the outside via the TACH terminal.

A signal obtained by superimposing a signal used for identifying the type of the brushless DC motor 200 on another signal is output from the brushless DC motor 200. Without increasing the number of wirings between the brushless DC motor 200 and the identification device 100, information for identifying the type of the brushless DC motor 200 is able to be transmitted from the brushless DC motor 200 to the identification device 100.

When power is supplied to the brushless DC motor 200, the superimposed signal is automatically output from the output terminal. The identification device 100 only needs to receive the output signal. Unlike the related art, communication by handshaking between the identification device 100 and the brushless DC motor 200, mode switching on the side of the brushless DC motor 200, and the like are unnecessary.

In certain embodiments, the drive circuit 210 includes the synthesizing circuit 270 that superimposes a pulse signal used for detecting a rotational speed of the brushless DC motor 200 and high frequency signals When a signal in which a pulse signal used for detecting a rotational speed of the motor and high frequency signals are superimposed is generated and output, information for identifying the type of the brushless DC motor 200 is able to be output with a simple and inexpensive circuit configuration.

In certain embodiments, the output terminal is the TACH terminal, and the drive circuit 210 outputs the superimposed signal to the outside via the TACH terminal.

Information for identifying the type of the brushless DC motor 200 is able to be transmitted from the brushless DC motor 200 to the identification device 100 without increasing the number of wirings between the brushless DC motor 200 and the identification device 100.

In certain embodiments, the synthesizing circuit 270 changes a method of superimposing high frequency signals on the pulse signal according to the level of the pulse signal.

Thereby, the identification device 100 is able to reduce noise when the superimposed signal is processed.

In certain embodiments, the synthesizing circuit 270 superimposes the inverted high frequency signal on the pulse signal when the pulse signal is at a low level.

Thereby, noise at the rising part of the pulse signal obtained by separation in the identification device 100 is able to be reduced.

In certain embodiments, the synthesizing circuit 270 superimposes the inverted high frequency signal on the pulse signal when the pulse signal is at a low level, and inverts the signal obtained by superimposition, and the drive circuit 210 outputs the inverted and superimposed signal via the output terminal.

Thereby, noise at the falling part of the pulse signal obtained by separation in the identification device 100 is able to be reduced.

The embodiment of the present disclosure is widely used for various devices including various fan motors such as a computer, a game machine, a vacuum cleaner, a drier, a washing machine and a refrigerator.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An identification method used for an identification device, comprising:
   identifying a type of a brushless DC motor,
   wherein the brushless DC motor includes an output terminal for outputting a signal,
   the output terminal is able to output a superimposed signal in which signals of a plurality of types are superimposed,
   the superimposed signal differs for each type of a plurality of brushless DC motors,
   a power is supplied to the brushless DC motor,
   the superimposed signal output from the output terminal of the brushless DC motor is input to the identification device,
   the superimposed signal is separated into signals of a plurality of types, and
   the type of the brushless DC motor is identified using a separated signal.

2. The identification method according to claim 1,
   wherein the separated signal is a unique signal that differs for each type of the plurality of brushless DC motors, and
   the type of the brushless DC motor is identified using a table showing the relationship between a plurality of types of unique signals and a plurality of types of brushless DC motors.

3. The identification method according to claim 1,
   wherein the output terminal is a tachometer terminal that outputs a pulse signal used for detecting a rotational speed of the brushless DC motor,
   a high frequency signal is superimposed on the pulse signal,
   a duty ratio of the high frequency signal differs for each type of the plurality of brushless DC motors,
   the high frequency signal is separated from the superimposed signal, and
   the type of the brushless DC motor is identified using the duty ratio of the high frequency signal.

4. The identification method according to claim 1,
   wherein the output terminal is a tachometer terminal that outputs a pulse signal used for detecting a rotational speed of the brushless DC motor,
   a plurality of types of high frequency signals having different duty ratios are superimposed on the pulse signal,
   different types of information are assigned to the plurality of types of high frequency signals,
   the plurality of types of high frequency signals are separated from the superimposed signal, and
   the type of the brushless DC motor is identified using the duty ratio of the plurality of types of high frequency signals.

5. The identification method according to claim 1,
   wherein the output terminal is a tachometer terminal that outputs a pulse signal used for detecting a rotational speed of the brushless DC motor,
   a high frequency signal is superimposed on the pulse signal,
   a frequency of the high frequency signal differs for each type of the plurality of brushless DC motors,
   the high frequency signal is separated from the superimposed signal, and
   the type of the brushless DC motor is identified using the frequency of the high frequency signal.

6. The identification method according to claim 1,
   wherein the output terminal is a tachometer terminal that outputs a pulse signal used for detecting a rotational speed of the brushless DC motor,
   a plurality of types of high frequency signals having different frequencies are superimposed on the pulse signal,
   different types of information are assigned to the plurality of types of high frequency signals,
   the plurality of types of high frequency signals are separated from the superimposed signal, and
   the type of the brushless DC motor is identified using the frequency of the plurality of types of high frequency signals.

7. The identification method according to claim 5,
   wherein the frequency of the high frequency signal is converted into a voltage, and
   a start of communication from the brushless DC motor is detected according to change in the voltage.

8. The identification method according to claim 5,
   wherein the frequency of the high frequency signal is converted into a voltage, and a level of the voltage is detected at predetermined time intervals for bit rates.

9. The identification method according to claim 8, wherein the level of the voltage is detected in a latter half of the predetermined time intervals for bit rates.

10. The identification method according to claim 3, wherein the frequency of the high frequency signal is 40 times or more the frequency of the pulse signal when the brushless DC motor operates at a maximum rotational speed.

11. The identification method according to claim 1, wherein the brushless DC motor is a fan motor including an impeller.

12. The identification method according to claim 1, wherein a power is supplied to the brushless DC motor from the identification device.

13. An identification device that identifies a type of a brushless DC motor,
wherein the brushless DC motor includes an output terminal for outputting a signal,
the output terminal is able to output a superimposed signal in which signals of a plurality of types are superimposed,
the superimposed signal differs for each type of a plurality of brushless DC motors,
the identification device includes
a power supply terminal for supplying a power to the brushless DC motor,
an input terminal that is electrically connected to the output terminal of the brushless DC motor,
a filter circuit that separates the superimposed signal into signals of a plurality of types, and
a controller that identifies a type of the brushless DC motor,
wherein the identification device acquires the superimposed signal output from the output terminal when the power is supplied to the brushless DC motor from the power supply terminal,
the filter circuit separates the superimposed signal into signals of a plurality of types, and
the controller identifies a type of the brushless DC motor using a separated signal.

14. A brushless DC motor, comprising:
a drive circuit that generates a superimposed signal in which signals of a plurality of types are superimposed;
an output terminal for outputting the superimposed signal; and
a power supply terminal for inputting a power,
wherein the superimposed signal includes a unique information of the brushless DC motor and the unique information differs for each type of a plurality of brushless DC motors, and
when the power is input via the power supply terminal, the drive circuit outputs the superimposed signal to an identification device identifying the unique information of the each type of the plurality of brushless DC motors via the output terminal.

15. The brushless DC motor according to claim 14, wherein the drive circuit includes a synthesizing circuit that superimposes a pulse signal used for detecting a rotational speed of the brushless DC motor and a high frequency signal.

16. The brushless DC motor according to claim 15, wherein the output terminal is a tachometer terminal that outputs the pulse signal, and
the drive circuit outputs the superimposed signal to the identification device via the tachometer terminal.

17. The brushless DC motor according to claim 15, wherein the synthesizing circuit changes a method of superimposing the high frequency signal on the pulse signal according to a level of the pulse signal.

18. The brushless DC motor according to claim 17, wherein the synthesizing circuit superimposes an inverted high frequency signal on the pulse signal when the pulse signal is at a low level.

19. The brushless DC motor according to claim 17, wherein the synthesizing circuit superimposes an inverted high frequency signal on the pulse signal when the pulse signal is at a low level, and inverts the superimposed signal obtained by superimposition, and
the drive circuit outputs the inverted superimposed signal via the output terminal.

* * * * *